United States Patent
Diosi et al.

(10) Patent No.: US 7,025,703 B2
(45) Date of Patent: Apr. 11, 2006

(54) MULTISTAGE AUTOMATIC TRANSMISSION WITH THREE PLANETARY GEAR SETS

(75) Inventors: Gabor Diosi, Friedrichshafen (DE); Josef Haupt, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/633,323

(22) Filed: Aug. 1, 2003

(65) Prior Publication Data

US 2005/0026741 A1    Feb. 3, 2005

(51) Int. Cl.
    *F16H 3/62* (2006.01)
(52) U.S. Cl. ........................... 475/276; 475/278
(58) Field of Classification Search ............ 475/276–8, 475/280, 288
    See application file for complete search history.

(56) References Cited

U.S. PATENT DOCUMENTS

| | | |
|---|---|---|
| 3,776,066 A | 12/1973 | Piret |
| 3,977,272 A | 8/1976 | Neumann |
| 4,070,927 A | 1/1978 | Polak |
| 4,395,925 A | 8/1983 | Gaus |
| 4,732,253 A | 3/1988 | Hiramatsu et al. |
| 4,939,955 A | 7/1990 | Sugano |
| 5,106,352 A | 4/1992 | Lepelletier |
| 5,232,411 A | 8/1993 | Hayashi et al. |
| 5,250,011 A | 10/1993 | Pierce |
| 5,295,924 A | 3/1994 | Beim |
| 5,308,295 A | 5/1994 | Michioka et al. |
| 5,435,792 A | 7/1995 | Justice et al. |
| 5,439,088 A * | 8/1995 | Michioka et al. ........... 475/276 |
| 5,460,579 A | 10/1995 | Kappel et al. |
| 5,520,588 A | 5/1996 | Hall, III |
| 5,533,945 A | 7/1996 | Martin et al. |
| 5,536,220 A | 7/1996 | Martin |
| 5,542,889 A | 8/1996 | Pierce et al. |
| 5,647,816 A | 7/1997 | Michioka et al. |
| 5,735,376 A | 4/1998 | Moroto et al. |
| 6,139,463 A | 10/2000 | Kasuya et al. |
| 6,471,616 B1 | 10/2002 | Stevenson |
| 6,558,287 B1 | 5/2003 | Hayabuchi et al. |
| 6,572,507 B1 | 6/2003 | Korkmaz et al. |
| 6,634,980 B1 | 10/2003 | Ziemer |
| 6,723,018 B1 | 4/2004 | Hayabuchi et al. |
| 6,773,370 B1 * | 8/2004 | Martyka et al. ............ 475/275 |
| 2002/0091032 A1 | 7/2002 | Hayabuchi et al. |

(Continued)

FOREIGN PATENT DOCUMENTS

DE      26 19 895      11/1976

(Continued)

*Primary Examiner*—Roger Pang
(74) *Attorney, Agent, or Firm*—Davis & Bujold, P.L.L.C.

(57) ABSTRACT

A multi-stage automatic transmission possesses an input drive shaft (AN), an output drive shaft (AB), three single planetary gear sets (RS1, RS2, RS3) as well as five shifting elements (A to E), by means of the pairwise selective closure of which, an entry speed of rotation of the input drive shaft (AN) can be transmitted to the output drive shaft (AB) without group shifting. A sun gear (SO3) of the third planetary gear set (RS3) can be set motionless by the first shifting element (A) on the transmission housing (GG). The input drive shaft (AN) is bound to a sun gear (SO2) of the second planetary gear set (RS2) and by means of the second shifting element (B) can be connected with a sun gear (SO1) of the first planetary gear set (RS1) and/or by means of the fifth shifting element (E) with a spider (ST1) of the first planetary gear set (RS1).

40 Claims, 10 Drawing Sheets

U.S. PATENT DOCUMENTS

| | | |
|---|---|---|
| 2002/0183160 A1 * | 12/2002 | Kao et al. .................. 475/269 |
| 2003/0060322 A1 | 3/2003 | Raghavan et al. |
| 2003/0083174 A1 | 5/2003 | Tabata et al. |
| 2003/0119623 A1 | 6/2003 | Stevenson et al. |
| 2003/0162625 A1 | 8/2003 | Raghavan et al. |
| 2004/0092357 A1 | 5/2004 | Biermann |
| 2004/0097324 A1 | 5/2004 | Ziemer |
| 2004/0116238 A1 | 6/2004 | Ziemer |
| 2005/0026740 A1 * | 2/2005 | Tiesler et al. ............... 475/278 |

FOREIGN PATENT DOCUMENTS

| | | |
|---|---|---|
| DE | 27 21 719 | 12/1977 |
| DE | 29 36 969 A1 | 4/1981 |
| DE | 38 25 733 A1 | 2/1989 |
| DE | 42 24 360 A1 | 1/1993 |
| DE | 42 24 361 A1 | 1/1993 |
| DE | 43 02 518 A1 | 8/1993 |
| DE | 43 32 466 A1 | 3/1995 |
| DE | 195 24 698 A1 | 2/1996 |
| DE | 197 02 198 A1 | 7/1998 |
| DE | 198 33 376 A1 | 12/1999 |
| DE | 199 12 480 A1 | 9/2000 |
| DE | 199 12 481 A1 | 9/2000 |
| DE | 199 49 507 A1 | 4/2001 |
| DE | 696 16 117 T2 | 7/2002 |
| DE | 102 00 379 A1 | 8/2002 |
| DE | 102 06 145 A1 | 9/2002 |
| DE | 101 15 983 A1 | 10/2002 |
| DE | 101 15 986 A1 | 10/2002 |
| DE | 101 15 987 A1 | 10/2002 |
| DE | 102 13 820 A1 | 10/2002 |
| DE | 101 46 606 A1 | 4/2003 |
| DE | 102 50 374 A1 | 6/2003 |
| DE | 101 62 877 A1 | 7/2003 |
| DE | 101 62 883 A1 | 7/2003 |
| DE | 101 62 888 A1 | 7/2003 |
| EP | 0 434 525 A1 | 6/1991 |
| EP | 0 605 953 A1 | 7/1994 |
| EP | 0 719 961 A2 | 11/1995 |
| EP | 1 265 006 A2 | 12/2002 |
| JP | 04290649 | 10/1992 |
| JP | 08200456 | 8/1996 |
| JP | 10259861 A | 9/1998 |
| JP | 2000240741 | 9/2000 |
| JP | 2001082555 | 3/2001 |
| JP | 2002323098 | 11/2002 |
| WO | WO-96/01381 | 1/1996 |

* cited by examiner

| gear | closed shifting elements | | | | |
|---|---|---|---|---|---|
| | A | B | C | D | E |
| 1 | ● | | | ● | |
| 2 | ● | | ● | | |
| 3 | ● | ● | | | |
| 4 | ● | | | | ● |
| 5 | | ● | | | ● |
| 6 | | | ● | | ● |
| R | | ● | | ● | |

Fig. 2
Prior Art

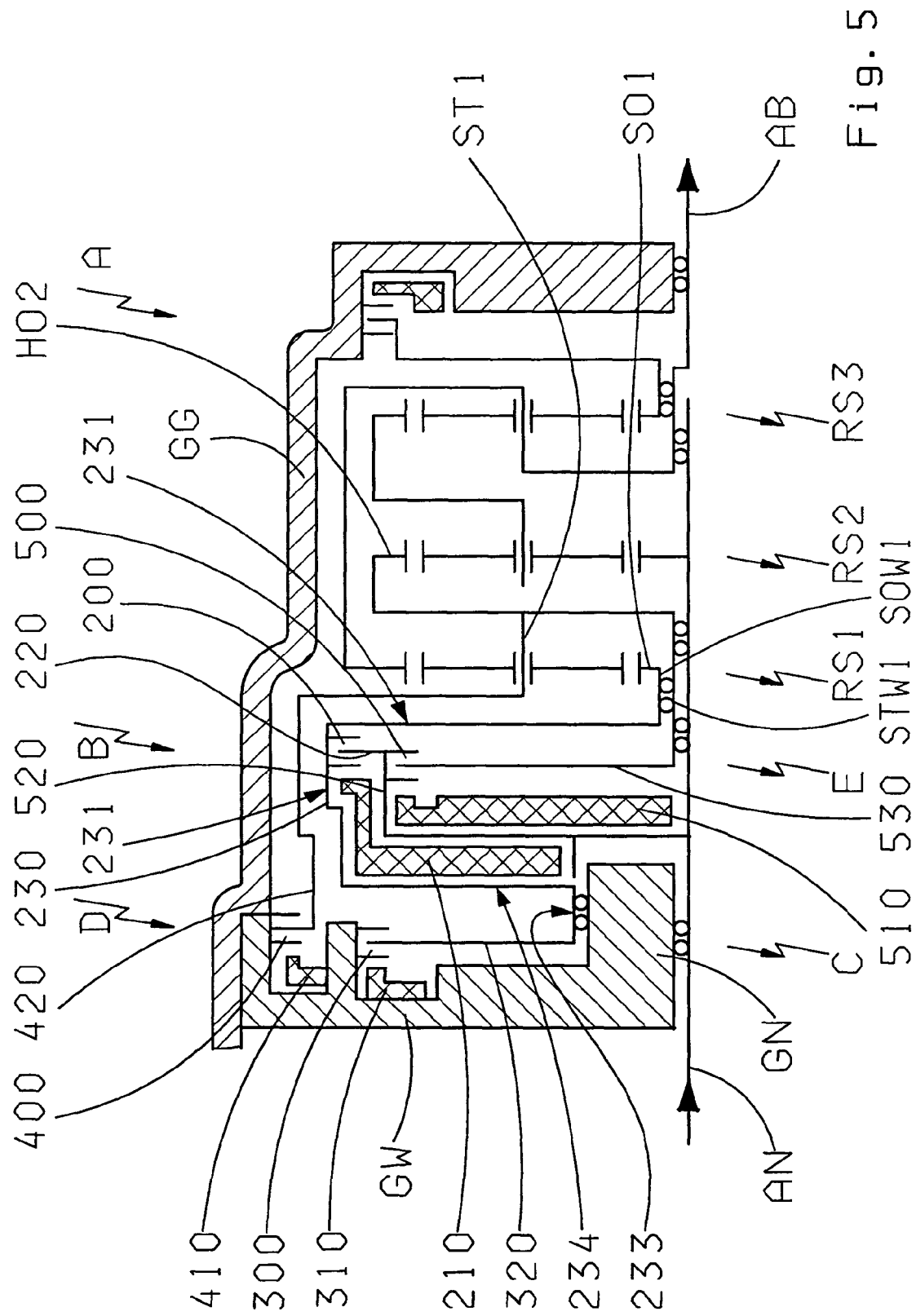

MULTISTAGE AUTOMATIC TRANSMISSION WITH THREE PLANETARY GEAR SETS

FIELD OF THE INVENTION

The present invention concerns a multistage, automatic transmission with at least three individual planet gear sets and at least five shifting elements.

BACKGROUND OF THE INVENTION

Automatic transmissions with a plurality of shiftable gears, without group shifting, are known in many examples. DE 199 12 480 A1 discloses a generic automatic transmission with three single spider planetary gear sets as well as three brakes and two clutches for shifting, thus allowing six forward gears and one reverse gear. For motor vehicles, this provides a very well adapted gear-change shifting as well as a good start-up ratio in the forward direction. The individual gears are achieved by selective closure of, at each time, two of the six shifting elements, so that for the gear transfer from the presently used ratio to another, either higher or lower, respectively only one shifting element need be opened and another shifting element closed.

As this is done, one input drive shaft of the automatic transmission is continually bound through a sun gear of the second planetary gear set. Further, the input drive shaft can be bound by means of the first clutch with a sun gear of the first planetary gear set and/or by means of the second clutch with a spider of the first planetary gear set. Additionally, or alternatively, the sun gear of the first planetary gear set can be bound by means of the second brake with the housing and/or a sun gear of the third planetary gear set by the third brake with the housing.

For the kinetic coupling together of the individual planetary gear set, DE 199 12 480 A1 describes two different versions. In the first version, provision has been made, that an output drive shaft of the automatic transmission is continually engaged with a spider of the third planetary gear set and with an internal gear of the first planetary gear set. The input drive shaft and the output drive shaft can, in this construction, be both placed coaxial to one another on opposite sides of the transmission housing as well as axis/parallel on the same side of the transmission housing. In the second version, provision has been made, that the output drive shaft is continually engaged with the spider of the second planetary gear set and with the internal gear of the first planetary gear set, also that the spider of the first planetary gear set is continually bound with the internal gear of the third planetary gear set, and that the internal gear of the second planetary gear set is continually engaged with the spider of the third planetary gear set. A construction of this type is particularly adaptable for a coaxial arrangement of the shafts for input and output.

Giving now consideration to the spatial arrangement of the planetary gear set, DE 199 12 480 A1 now proposes, that the three planetary gear sets be placed coaxially in a sequence, one next to the other, whereby the second planetary gear set appears axially between the first and the third planetary gear set. Further as to the spatial arrangement of the individual shifting elements, relative to one another and relative to the planetary gear sets, DE 199 12 480 A1 also suggests, that the first and the second brake are continually placed next to one another, whereby the second brake is always directly placed axially proximal to the first planetary gear set, and the third brake is always on that side of the planetary gear set which is remote for the third planetary gear set. With the arrangement, the two clutches are continually located directly beside one another. In a first arrangement variant, both clutches are upon that side of the third planetary gear set which is on the remote side of the first planetary gear set. In this way, the first clutch is axially directly bordering on the first brake and is closer to the first planetary gear set than is the second clutch. In connection with a non-coaxial location of the input drive shaft and the output drive shaft, in a second arrangement variant, the proposal is, that both clutches be placed on the remote side of the third planetary gear set, whereby, the second clutch is closer to the third planetary gear set than is the first clutch, and is axially located on output drive shaft active end, which placement, once again, places it on that side of the third brake which is remote side from the third planetary gear set.

The present invention, thus has the purpose of presenting an alternate arrangement of components for the automatic transmission made known as the state of the technology by DE 199 12 480 A1, wherein the most compact transmission assembly is made possible and in the longitudinal direction of the said transmission the design is most space saving. Preferably, the automatic transmission is designed to find application in a motor vehicle with a standard input drive and coaxially aligned drive shafts for input and output. Conversely, however, by means of the most relatively simple modifications the design can be used for non-coaxial input and output drive shafts.

SUMMARY OF THE INVENTION

Using as a starting point, the generic state of the technology of DE 199 12 480 A1, the multistage automatic transmission possesses at least three inter-coupled single planetary gear sets, which are arranged coaxial to one another, and when seen spatially, are always successively next to one another, whereby the second planetary gear set, again seen spatially, is always between the first and the second planetary gear set. Furthermore, the multistage automatic transmission has at least five shifting elements. One sun gear of the third planetary gear set can be affixed on the transmission housing of the multistage automatic transmission by means of the first shifting element, which same is constructed as a braking element. One input drive shaft of the multistage automatic transmission is continually engaged with a sun gear of the second planetary gear set. Also, the input drive shaft, by means of the clutch—designed as the second shifting element—is bound to a sun gear of the first planetary gear set and additionally or alternatively, joined by means of the fifth shifting element—which in turn is designed as a clutch—with a spider of the first planetary gear set. Alternative again to the above, the sun gear of the first planetary gear set, by means of the third shifting element, which is designed as a brake, and/or the spider of the first planetary gear set is connected by the fourth shifting element, which is designed as a brake, to the transmission housing.

One output drive shaft of the multistage automatic transmission is continually and actively engaged with an interior gear of the first planetary gear set, whereby the interior gear of the first planetary gear set additionally, is continually connected either with one spider of the third planetary gear set or with a spider of the second planetary gear set.

In accord with the invention, the third and the fourth shifting element, when spatially observed, are placed radially over one another and the fifth and the second shifting element, in their spatial relationship, are also radially over one another. In this way, when compared to the state of the technology as set forth in DE 199 12 480 A1, a clearly more compact transmission construction is achieved with an advantageously shorter installation length.

Now considering the arrangement of the (designed as a brake) third and the (likewise designed as a brake) fourth shifting element in their relation to one another, the proposal, in accord with the invention, is that the third shifting element, by means of which the sun gear of the first planetary gear set is solidly set, is to be placed radially below the fourth shifting element, by means of which the spider of the first planetary gear set is affixed. The disks of the third shifting element possess also a smaller diameter on the disks of the fourth shifting element, and a servo apparatus of the third shifting element is, again spatially observed, at least essentially placed radially beneath a servo apparatus of the fourth shifting element.

Advantageously, the servo apparatuses of the third and the fourth shifting elements, here described, are integrated into a common, transmission housing wall and activate their respective disks of the third and fourth shifting elements axially in the direction of the first planetary gear set. Seen in its actuality, an interposed plate is also placed on that side of the disks of the third/fourth shifting element which is remote from the first planetary gear set and also possesses a corresponding piston/pressure space with a therein slidable pistons for these to servo apparatuses. The pistons are responsive to said pressure.

In regard to the placement of the fifth (designed as a clutch) and second (designed as a brake) shifting elements in relation to one another, the invention proposes that the fifth shifting element, by means of which the input drive shaft is connected with the spider of the first planetary gear set, and the second shifting element, by means of which the sun gear of the first planetary gear set can be connected with the input drive shaft, are so interlinked together, that the fifth shifting element at least is essentially placed within the clutch space of the second shifting element. The disks of the fifth shifting element possess, then, a smaller diameter than do the disks of the second shifting element, and a servo apparatus of the fifth shifting element is placed (spatially seen) advantageously completely underneath a servo apparatus of the second shifting element.

Advantageously the second, third, and fourth shifting elements are all placed on one side of the transmission, and indeed upon that side of the first planetary gear set which lies opposite to the second planetary gear set. The brake designed first shifting element, by which the sun gear of the third planetary gear set is made fast, is, in this relationship, advantageously (as seen spatially) on that side of the third planetary gear set which is remote from the second planetary gear set, that is to say, on that side of the planetary gear set which is opposite to the other four shifting elements. In the case of an input drive shaft and an output drive shaft which run coaxially together, in this arrangement, the output shaft which is operationally bound to the internal gear of the first planetary gear set, now penetrates, centrally and in an axial direction, the third planetary gear set and a clutch space of the first shifting element. For an application with a non-coaxial alignment of the input and output drive shafts, thus, for example, an axis parallel or angular disposition of said drive shafts, the output drive shaft can, again as seen spatially, be operationally connectable in the zone radially above the planetary gear set with the internal gear of the first planetary gear set.

In a first embodiment, the fourth shifting element is enabled to affix the first planetary gear set. Further the third shifting element is radially located under the said fourth shifting element, by means of which the sun gear of the first planetary gear set can be affixed. Both said shifting elements are directly axially bordering the first planetary gear set, on that side of said gear set which is distal from the second planetary gear set.

Advantageously, the servo apparatuses of the third and the fourth shifting element in this arrangement—as already described—are integrated into a common, transmission housing affixed wall, which, in this first embodiment, is designed as a housing intermediate wall. The servo apparatuses of the third and the fourth shifting element activate the respective disks of the third/fourth shifting elements axially in the direction of the first planetary gear set. Spatially observed, the housing intermediate wall is also placed on that side of the disks of the third/fourth shifting element, which side is remote from the first planetary gear set. The intermediate housing wall further possesses a corresponding piston space (i.e., pressure space) with a therein slidable piston which said piston is responsive to pressures of its corresponding servo apparatus.

Furthermore, there is in this first embodiment of the present invention, the fifth shifting element—as well as the disks and the servo apparatus of the fifth shifting element—at least essentially completely placed within the clutch place of the second shifting element. These two clutches, which are interconnected with one another, are placed on that side of the housing intermediate wall which is remote from the first planetary gear set. Thus, when seen in the direction of the planetary gear set, these two clutches are axially before the third/fourth shifting element. In this arrangement, the disks border the second and/or the fifth shifting element directly on this housing intermediate wall. The disks of the second and the fifth shifting element are activated by the respectively assigned servo apparatus are also activated axially in the direction of the first planetary gear set.

In an advantageous development of this first, inventive embodiment, a dynamic pressure compensation of the (spatially seen) outer second shifting element can be so designed, that a clutch cylinder—for instance an outside disk carrier—of the spatially observed inner fifth shifting element, together with the servo apparatus (piston) of the second shifting element, can form a pressure compensation space of the second shifting element. Acting in a known manner, this pressure compensation space is able to allow that by the compensation of the rotational pressure of a rotating pressure space, the second shifting element can be filled with lubricating oil which is not under pressure.

In a second embodiment of the invention, the fourth shifting element is once again placed immediately radially above the third shifting element and the servo apparatuses of the third and fourth shifting elements are integrated into a common, transmission housing fixed wall, which also possesses the corresponding piston space (pressure space) with the therein, slidingly placed, pressure loaded pistons of these two servo apparatuses. This solid transmission housing wall now forms an outer wall for the transmission housing, which, spatially observed, is located on that side of the first planetary gear set, which lies opposite to the second planetary gear set. The servo apparatuses of the third and the fourth shifting elements activate their respective disks of the third or fourth shifting element axially in the direction of the first planetary gear set.

In addition, there is to be seen in this second embodiment of the present invention, the fifth shifting element—both the disks as well as the servo apparatus of the fifth shifting element—placed at least considerably within the clutch space of the second shifting element. Seen spatially, these two interconnected clutches are now axially located between the two brakes placed on the housing outer wall (axially between the third and the fourth shifting element) and the first planetary gear set, directly adjacent to the said first planetary gear set. Both servo apparatuses of the second and the fifth shifting elements activate the corresponding disks of the second and the fifth shifting element axially in the direction of the first planetary gear set.

All proposed, invented component assemblies can be used on the basis of both the planetary gear schemes of the state of the technology as presented by DE 199 12, 480 A1. In such a case, that the internal gear of the first planetary gear set and the spider of the third planetary gear set, plus the output drive shaft are all coupled together, then the spider of the second planetary gear set will be found continually bound with an internal gear of the third planetary gear set and the spider of the first planetary gear set will be continually connected to an internal gear of the second planetary gear set. In case the internal gear of the first planetary gear set and the spider of the second planetary gear set and the output drive shaft are all coupled with one another, then the spider of the third planetary gear set is continually connected with the internal gear of the second planetary gear set and the spider of the first planetary gear set is continually connected with the internal gear of the third planetary gear set.

By means of the kinematic couplings of the individual gear set components among each other, and with the input drive shaft and the output drive shaft by means of the five shifting elements—as is the case in the state of the technology in accord with DE 199 12 480 A1—all six forward gears become available, so that by shifting from one gear into the next successive higher or lower gear, from the immediately activated shifting element, in each case, only one shifting element need be opened and one other shifting element need be closed.

BRIEF DESCRIPTION OF THE DRAWINGS

The invention will now be described, by way of example, with reference to the accompanying drawings in which:

FIG. 2 a line diagram of the transmission in accord with FIG. 1;

FIG. 5 an exemplary second schematic component assembly of the invention;

DETAILED DESCRIPTION OF THE INVENTION

Figure 1:
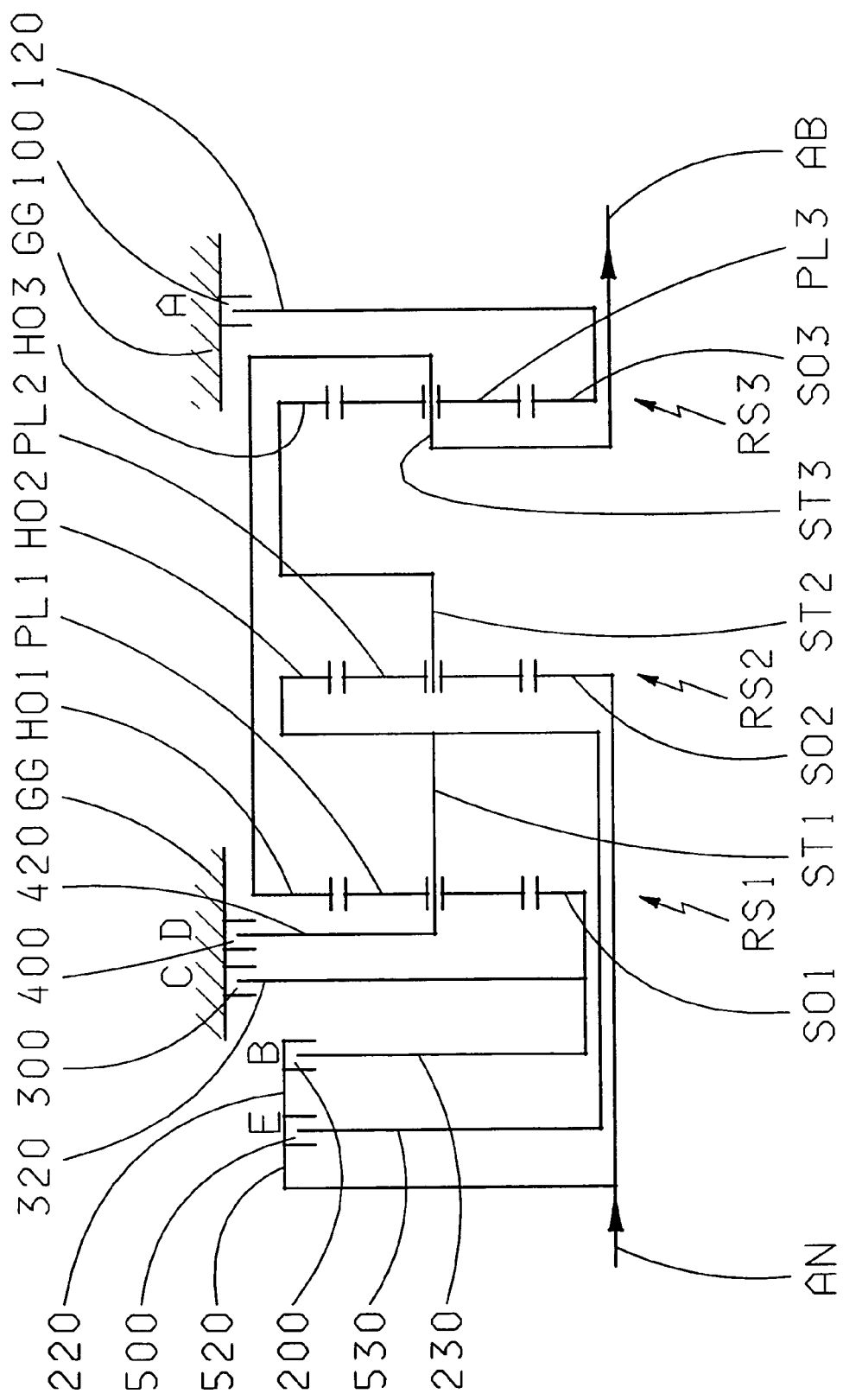
FIG. 1 a transmission scheme in accord with the state of the technology.

For the purpose of clarification of the invented component arrangements, FIG. 1 first exhibits a transmission scheme of a multistage automatic transmission for a motor vehicle with a standard power drive, as this may be seen from the state of the technology disclosed by the DE 199 12 480 A1. An input drive shaft of the automatic transmission is designated as AN, which is actively engaged with a (not shown) drive motor, possibly by means of a torque converter, a start-up clutch, a torsion damper, a double weighted flywheel, or a rigid shaft. AB denotes a transmission output shaft, which interacts with at least one input axle of the motor vehicle. In the presented embodiment, the input shaft AN and the output shaft AB are placed coaxially to one another. RS1, RS2 and RS3 indicate three coupled, simple planetary gear sets, which are shown here beside one another in a row in a transmission housing GG. All three planetary gear sets RS1, RS2 and RS3 possess, respectively, one sun gear SO1, SO2, and SO3, respectively one interior gear HO1, HO2, and HO3. Likewise each has one spider, namely ST1, ST2 and ST3 with associated planet gears PL1, PL2 and PL3, which, respectively, interact with the sun and internal gears of the respective planetary gear sets. A to E designate five shifting elements, wherein the first, third and fourth shifting element A, C, D serve as a brake and the second and fourth shifting elements B and E are designed to be clutches. The respective friction covering of the five shifting elements A to E are provided as disk packets 100, 200, 300, 400 and 500 (in each case with outside/inside disks of steel or friction material). The respective input elements of the five shifting elements A to E are, designated with 120, 220, 320, 420 and 520. The respective output elements of the clutches B and E are designated as 230 and 530. The kinematic connection of the individual planetary gear elements and shifting elements, relative to one another and relative to the input/output drive shafts have already been described in detail, as has the spatial arrangement of the same.

As is easily seen from the shifting scheme of FIG. 2, by selective shifting of respectively two of the five shifting elements A to E, six forward gears can be shifted to, free of group shifting and also in such a manner, that for the reshifting from one gear to the next higher or lower ratio, from the current shift mode, in any case, only one shifting element need be opened and another shifting element be closed. Closures are as follows: in 1st gear—brakes A and D; in 2nd gear—brakes A and C; in 3rd gear—brake A and clutch B; in 4th gear—brake A and clutch E; in 5th gear—clutch B and clutch E; and in 6th gear—brake C and clutch E. Where reverse driving is concerned, this being "R", then clutch B and brake D are closed.

With the FIGS. 3 to 6 available for reference, in the following two examples for an invented component assembly is explained in detail, as well as with reference to the FIGS. 7, 8, respectively a variation for the relative arrangement of input and output drive shafts and for the coupling of individual planetary gear set-elements with one another.

Figure 3:
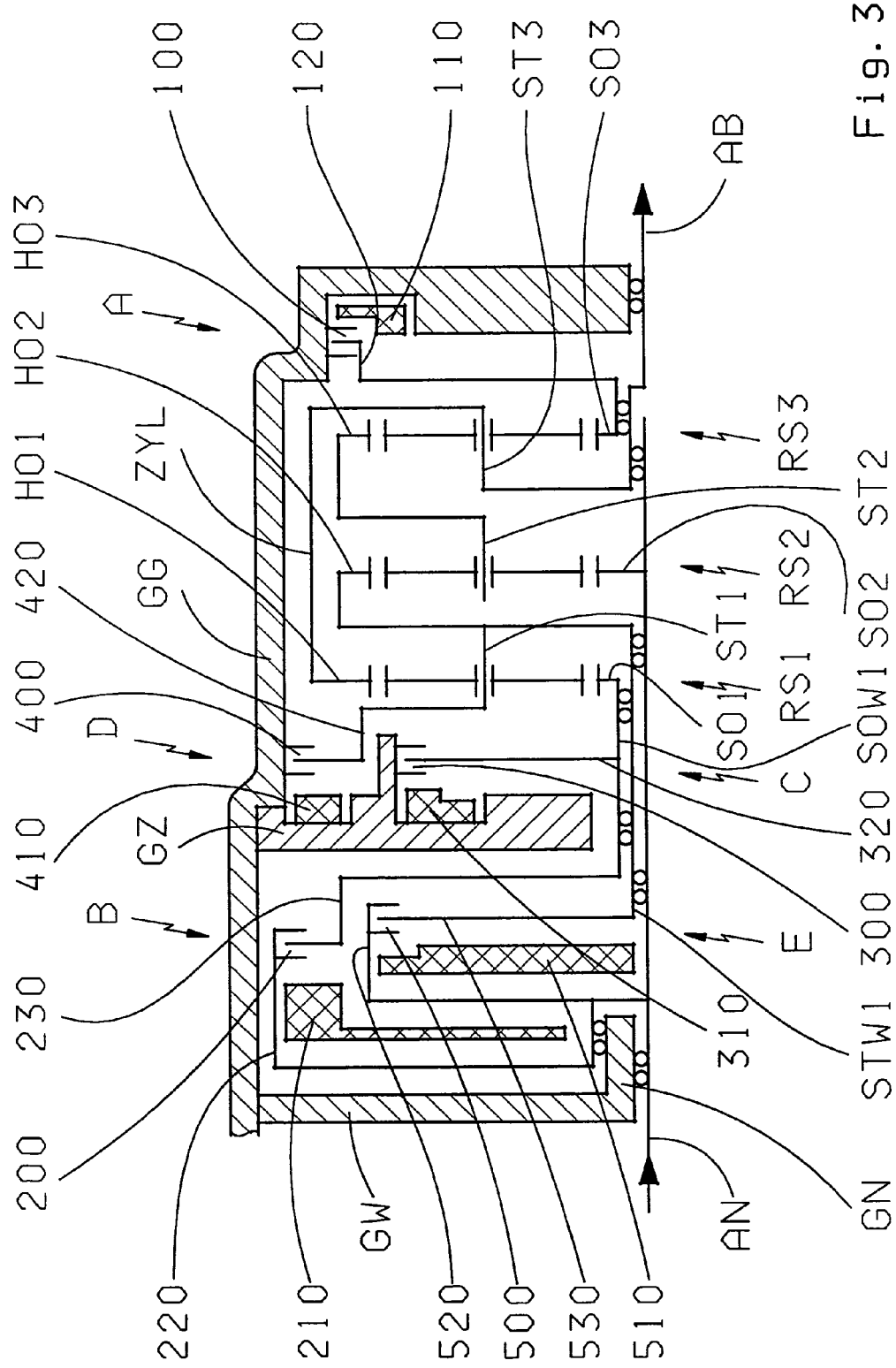
FIG. 3 an exemplary first schematic component assembly of the invention.

Looking now at FIG. 3, there is shown a first schematic component arrangement, particularly for the achievement of the state purpose of the invention. Starting from the previously described state of the technology, as set forth in DE 199 12 480, the invented multi-stage automatic transmission possesses three, coupled, coaxially aligned, single planetary gear set elements RS1, RS2, RS3, in a successive row. In this arrangement, the second planetary gear set element RS2 is set axially between the first and the third planetary gear set elements RS1, RS3. Further, the multi-stage automatic transmission possesses five shifting elements A to E. The first, third and fourth of these shifting elements are respectively designed as brakes (in the embodiment example shown as disks brakes), the second and fifth shifting element is respectively designed as a clutch (in the embodiment example shown as disks clutches). A sun gear SO3 of the third planetary gear set RS3 is affixed over the brake A on a transmission housing GG of the multi-stage automatic transmission. An input drive shaft AN of the multistage automatic transmission is continually bound to a sun gear SO2 of the second planetary gear set RS2. Further, the input drive shaft AN, by means of the clutch B is connected with a sun gear SO1 of the first planetary gear set RS1 and additionally, or alternately by means of the clutch E can be connected with a spider ST1 of the first planetary gear set RS1. Alternatively, first, the sun gear SO1 of the first planetary gear set RS1, by means of the brake C and/or, second, the spider ST1 of the first planetary gear set RS1 by means of the brake D, respectively can be affixed onto the transmission housing GG.

One output drive shaft AB of the multistage automatic transmission is continually connected with an internal gear HO1 of the first planetary gear set RS1, whereby this internal gear HO1, in the here presented exemplary coupling of the planetary gear elements is additionally continually connected with a spider ST3 of the third planetary gear set RS3. Yet further, a spider ST2 of the second planetary gear set RS2 is continually engaged with an internal gear HO3 of the third planetary gear set RS3, as well as spider ST1 of the first planetary gear set RS1 is continually in connection with an internal gear HO2 of the second planetary gear set RS2. The corresponding connective element between the interior gear HO1 of the of the first planetary gear set RS1 and the spider ST3 of the third planetary gear set RS3 is designed as cylinder ZYL. This cylinder ZYL first, is connected with interior gear HO1 by means of an appropriate operative connection, for instance by welding, and extends itself in an axial direction from the said interior gear HO1 up to beyond the internal gear HO3. Second, the cylinder ZYL on that side of the third planetary gear set RS3 remote from the second planetary gear set RS2 is connected with a web plate STB3 of the spider ST3 by means of a corresponding operational binding, this binding would be, for example, by means of a "come-along" profile. The cylinder ZYL completely overlaps the second and third planetary gear sets, namely RS2, RS3.

The first planetary gear set RS1 is, in the axial direction and centrally, completely penetrated by two shafts, namely from one, being a spider shaft STW1 designed as an internal gear, and from a second, this being the input drive shaft AN running within the said spider shaft STW1. With this arrangement, the spider shaft STW1 in on that side of the first planetary gear set RS1 which is proximal to the second planetary gear set RS2, and is connected with the spider ST1 of the first planetary gear set RS1 and with the internal gear HO2 of the second planetary gear set RS2 and upon that side of the first planetary gear set RS1 which is remote from the second planetary gear set RS2, the said spider shaft STW1 is bound to the output element 530 of the clutch E. On that side of the first planetary gear set RS1, which is distal from the second planetary gear set RS2, runs the spider shaft STW1 radially within a sun gear SOW1—which is likewise designed as an internal gear. This sun gear SOW1, once again, is first, bound with the sun gear SO1 of the first planetary gear set RS1, and second upon which sun gear SOW1 is bound to that side of the first planetary gear set RS1 which is remote from the second planetary gear set RS2 with an input element 320 of the brake C and an output element 230 of the clutch B.

The second, spatially seen, middle planetary gear set RS2 is only centrally penetrated by the input drive shaft AN in an axial direction. For the achievement of a favorable bearing seating of the input and output drive shafts AN, AB in the zone of the third planetary gear set RS3, the input drive shaft AN extends itself up to under the sun gear SO3 of the third planetary gear set RS3. The output drive shaft AB, in this zone, is borne radially on the input drive shaft AN, whereby the output drive shaft AB, which is operationally bound with the interior gear of the HO1 of the first planetary gear set RS1, penetrates the third planetary gear set RS3 fully in an axial direction. The sun gear SO3 of the third planetary gear set RS3 once again is borne upon the output drive shaft AB.

The brake A, by means of which the sun gear SO3 of the third planetary gear set RS3 is set fast, when observed spatially, is placed on that side of the third planetary gear set RS3 which is remote from the second planetary gear set RS2. With this arrangement, an input element 120, which is designed as an inner disks carrier, the brake A axially on the spider ST3 of the third planetary gear set RS3, upon that side thereof which is remote from the second planetary gear set RS2. A disk packet 100 of the brake A, having both outside and friction disks, is of a large diameter in the proximity of the outer wall of the transmission housing GG which is remote from the third planetary gear set RS3. A come-along profile for the outside disks of the disk packet 100 can, in a simple manner, be integrated into the transmission housing GG. Obviously, for the brake A, however, even a separate outside disks carrier can be provided. This separate carrier could be connected with the transmission housing by appropriate materials so that the connection would form a shape, force or material insert closure. A servo apparatus 110 of the brake A for the activation of the disks 100 is integrated into the outer wall of the transmission housing and activates the disks 100 axially in the direction of the three planetary gear sets RS1, RS2, RS3, whereby this outer wall obviously can be made to serve as a housing cover, which is in connection with the transmission housing GG, perhaps by bolting. For this purpose, the transmission housing possesses a corresponding piston and pressure space and therein a slidably carried, pressure responsive piston for the servo apparatus 110, as well as a corresponding (not shown) pressure medium feed line to the said pressure space. The brake A is also completely penetrated centrally by the output drive shaft AB in the axial direction.

The other four shifting elements, B to E, are placed on that side of the first planetary gear set RS1, which is remote from the second planetary gear set RS2, that is to say, in the embodiment example shown in FIG. 3, on that side of the automatic transmission, which is proximal to the (not shown) driving motor, which motor is operationally connected to the input drive shaft AN.

As may be further seen in FIG. 3, the two brakes C, D are placed over one another as are, respectively, the two clutches B, E. In this case, then, the two brakes C, D are placed immediately proximal to the first planetary gear set RS1. The two clutches B, E, on the other hand, are proximal to a housing wall GW, which is part of the transmission housing GG. At the same time, this forms the outer wall of the automatic transmission. In FIG. 3, this housing wall GW is shown on the motor side of the transmission.

The brake D is placed on a large diameter in the area if the inner diameter of the transmission housing GG, whereby the transmission housing GG, for example, simultaneously takes over the function of a outside disks carrier for the outside disks of the disk packet 400 of the brake D. Obviously, it can be understood, that also a separate outside disks carrier can be provided for the brake D, which, in such a case, would be bound to the transmission housing GG by means of appropriate materials. The disks 400 border axially on the first planetary gear set RS1. An entry element 430 of the brake D, which entry element has been designed as an inner, pot shaped, disks carrier, extends itself underneath the disks axially in the direction of the first planetary gear set RS1 and is bound onto the side of the said first planetary gear set RS1 with the spider ST1 thereof, which lies opposite to the second planetary gear set RS2. A servo apparatus 410 of the brake D for the activation of the disks 400 is integrated into a housing intermediate wall GZ. This intermediate housing wall GZ, closes itself, when spatially observed, on the disk packet 400 on that side thereof which is remote from the first planetary gear set RS1 and is connected with the transmission housing GG in an adaptable manner—for instance, force fit. Under a pressure loading of the servo apparatus 410, the disks are also activated axially in the direction of the first planetary gear set RS1.

The brake C, again spatially observed, is found underneath the brake D. Especially, the disk packet 300, when seen in the axial direction, is at least predominately located radially underneath the disk packet 400 of the brake D. The disks 300 have also a smaller diameter than do the disks 400. The intermediate wall GZ which is connected with the transmission housing GG assumes simultaneously the function of an outside disks carrier for the outside disks of the disk packet 300 of the brake C. An input element 320 of the brake C, for example, is here designed as a generally disks-shaped inner disks carrier, which extends itself radially in the direction of the input drive shaft AN and is bound with the sun gear SOW1 on its inner diameter. As the servo apparatus 410 of the brake D is integrated into the housing intermediate wall GZ, so also is a servo apparatus 310 of the brake C integrated for the activation of the disks 300. Seen spatially, this servo apparatus 310 is placed radially underneath the servo apparatus 410 and upon being subjected to pressure, activates the disks 300 axially in the direction of the first planetary gear set RS1.

The intermediate housing wall GZ form, thus, a well planned pre-mounted component group of the automatic transmission, thus carrying the servo apparatuses 314, 410, both brakes C, D inclusive of the thereto pertinent pressure medium feed means, and also the outside disks carrier of the brake C. In another embodiment, provision can also be made, that the housing intermediate wall GZ serves also as an outside disks carrier of the radial, outer brake D.

The two clutches B, E are placed on the two brakes C, D, that is, placed on that side which is remote from the first planetary gear set RS1. In this way, the intermediate housing wall GZ is centrally penetrated by the three shafts, which are running radially within one another, namely SOW1, STW1 and AN. The two clutches B and E are coalesced within one another as a component group, whereby the clutch E is placed at least mainly within a clutch space, which has been shaped by a clutch cylinder. In the presented example shown in FIG. 3, an input element 220 designed as a outside disks carrier of the clutch B, forms this clutch cylinder, in the form of a pot, opening toward the first planetary gear set RS1, the base of which, borders axially on the housing wall GW and on its inside diameter is bound to the input drive shaft AN. A servo apparatus 210 of the clutch B is within this clutch cylinder 220 and, upon being subjected to pressure, axially activates the disks 200 of the clutch B in the direction of the first planetary gear set RS1. Correspondingly, an output element 230 of the clutch B is designed as an inner disks carrier. Spatially, observed, this disks carrier 230 extends itself axially up to the intermediate housing wall GZ and—bordering parallel to the intermediate housing wall, GZ—continues inward up to the sun gear SOW1, with which it connects.

The input element 520 of the clutch E is designed as an outside disks carrier, in the form of a pot shaped clutch cylinder opening in the direction of the first planetary gear set RS1, said cylinder having a base extending radially, which borders axially on the servo apparatus 210 of the clutch B and is connected at its interior diameter with the input drive shaft AN. Further, the altered input element has a cylindrical section which extends itself in the axial direction beneath the disk packet 200 of the clutch B and can pick up at its inner diameter, outside disks of the disk packet 500 of the clutch E. Observed spatially, the disks 500, in this matter, are placed at least partially in the axial direction, radially underneath the disks 200 of the clutch B, further, the said disks 500 are of smaller diameter than are the disks 200 of the clutch B. A servo apparatus 510 of the clutch E is placed within the clutch cylinder 520 of the clutch E and activates axially, in the direction of the first planetary gear set RS1, the disks 500 of the clutch E upon being exposed to pressure. Correspondingly, an output 530 of the clutch E is made as an inner disks carrier 530, parallel to the intermediate wall of the housing GZ, extending inward up to the spider shaft STW1, with which it is connected, and in doing so, sectionally borders, axially onto the inner disks carrier 230 of the clutch B.

Both servo apparatuses 210, 510 of the clutches B, E rotate, then, continually with that speed of rotation given by the input drive shaft AN and can, with very simple means, be dynamically pressure equalized. In the transmission scheme as shown in FIG. 3, is the kinematic connection of the two entry elements 220, 520 of the clutches B, E on the input drive shaft AN. This is carried out as an example, in that a common hub of the input elements 220, 520 is seated on a projection of the housing wall GW, which extends itself axially into the interior of the transmission housing GG. The channels appropriate for the pressure medium feed to the servo apparatuses 210 and 510 of the clutches B, E can, for example, be run in a relatively simple manner over this projection of the housing wall GW and this common hub.

By means of the component assembly as shown in FIG. 3, spatially observed, achieve a very compact transmission construction. The disks 200 of the thermally heavily loaded clutch B are made in an advantageous large diameter. In like manner, the disks 400, are of large diameter, these being, statically, for the most severely stressed brake D of all five shifting elements A to E.

The shifting scheme of the multi-stage, automatic transmission in accord with FIG. 3 corresponds with that scheme presented in FIG. 2. As in the state of the technology as given by DE 199 12 480 A1, it is possible, by selective shifting of only two gears of the five shifting elements, to achieve six forward speeds, free of group shifting.

Figure 4A:
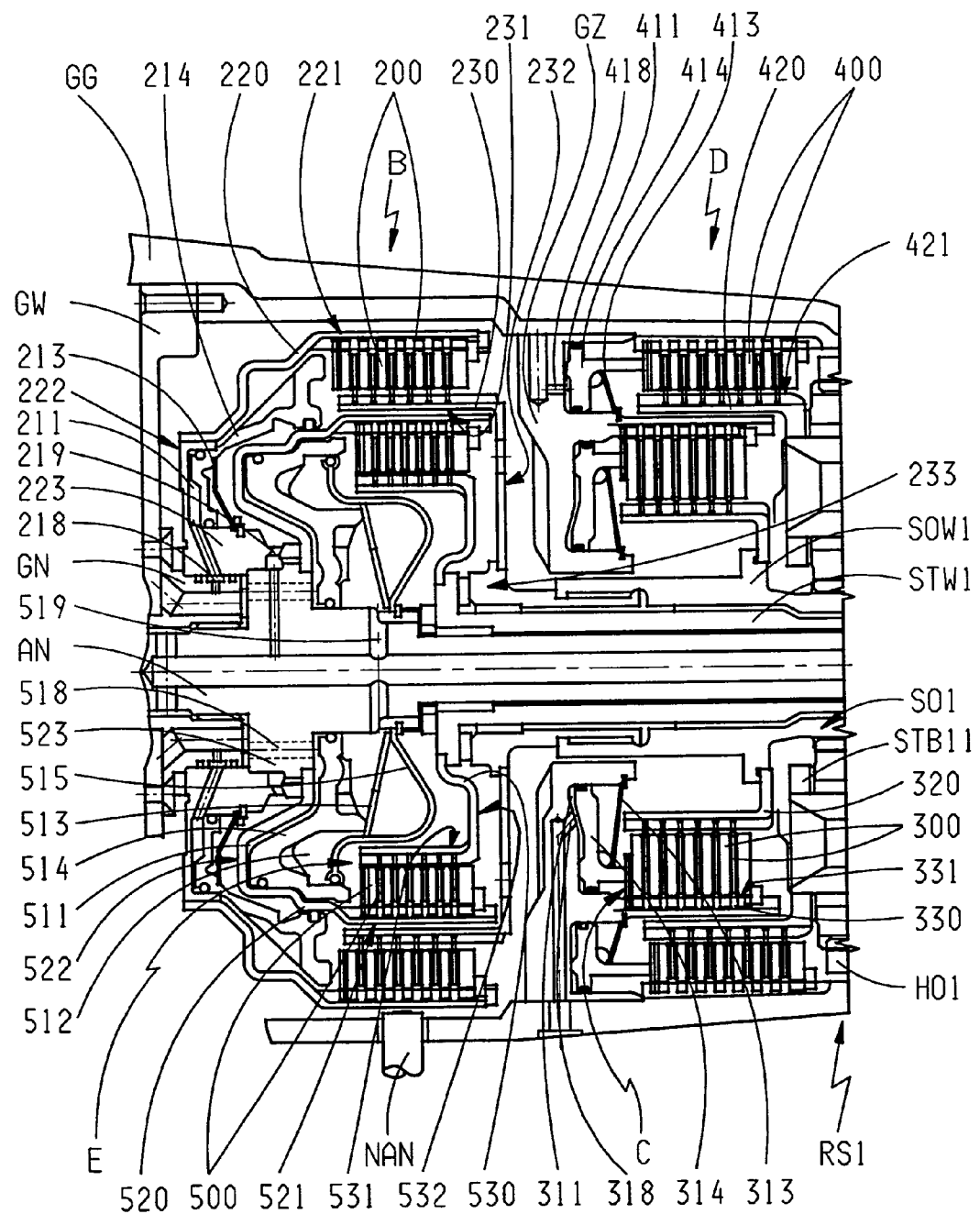
FIG. 4 a section of the transmission in accord with FIG. 3, i.e., 4a and 4b.
Figure 4B:
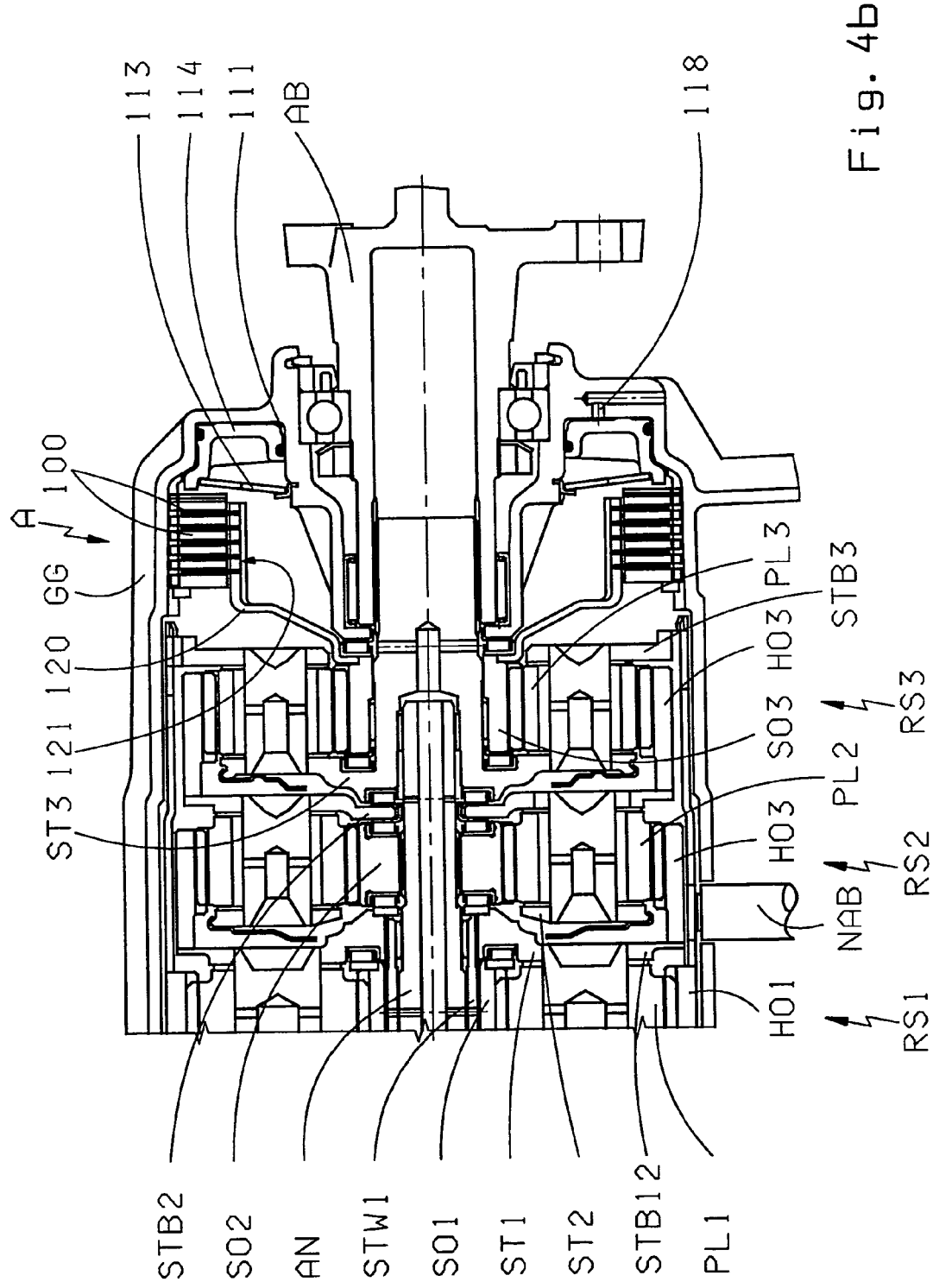

Now considering FIG. 4, a practically assembled transmission construction is explained, wherein the kinematic coupling and the spatial arrangement of the three single planetary gear sets RS1, RS2, RS3 and the five shifting elements A to E, within the transmission housing GG and relative to one another in the principle of that of FIG. 3 are all schematically presented in a sketch. Corresponding to the coaxial arrangement of the input and output drive shafts, namely AN and AB, in this embodiment example, the automatic transmission for a motor vehicle with a standard drive is provided, For a better presentation, the transmission depiction is divided into two section, namely 4*a* and 4*b* whereby that part proximal to the drive motor (not shown) of the automatic transmission in FIG. 4*a* and the output section is shown in FIG. 4*b*.

As may be seen in FIG. 4, a housing wall GW is connected, preferably by bolting to the transmission housing GG and forms thus an outer wall in the direction of a (not shown) drive motor, that is to say, in the direction of an eventually existing startup element outside of the transmission housing GG, this being, perhaps, a torque converter or a startup clutch of the automatic transmission. This housing wall GW possesses in detail, pressure feeding means which are not further described here, which can, for instance, be an oil pump for the pressure and lubrication supply of the said automatic transmission. Axially in the direction of the interior of the automatic transmission housing GG there extends a hub GN firmly attached to the housing wall GW. This hub GN can, for instance, be a portion of the stator shaft of a torque converter. In another embodiment, the hub GN and the housing wall GW can also be manufactured as one piece. In still another embodiment, the transmission housing GG and the housing wall GW or, again, the transmission housing GG and the housing wall GW plus the hub GN can be manufactured as one piece. Radially within the hub GN runs the input drive shaft AN of the automatic transmission and centrally penetrates, in doing this, the housing wall GW.

On the hub GN is mounted another hub, namely 223, of an input element 220 of the clutch B. This input element 200 is serving as an outside disks carrier and is in the form of a pot, which opens in an opposite direction to the housing wall GW. On the hub 223, there is connected an at least partially disks-like section 222 of the entry element 220 and extends itself radially to the outside. On this, at least partially disks shaped section 222 is connected an at least predominately cylindrical section 221 of the input element 220, which extends itself axially, in a direction away from the housing wall GW up to a disk packet 200 of the clutch B with inner and outer disks. On its interior diameter, the cylindrical section 221 possesses a characteristic come-along profile adapted for the acceptance of the outside disks of the disk packet 200. The said disk packet is placed on a large diameter, in the neighborhood of an inner diameter of the transmission housing GG. Within the outside disks carrier 220 of the clutch B, is to be found a servo apparatus for the activation of the clutch B. A piston 214 of this servo apparatus borders, thereby, on the outside disks carrier section 222 and forms, together with the outside disks carrier section 222 a pressure space 211 for the servo apparatus of the clutch B. Under the application of pressure of this pressure space 211 through a corresponding pressure feed line 218, the piston 214 activates the disks 200 in a direction away from the housing wall GW, against the restoration force of a restoration element 213, which in this case, is identified as a plate spring. The pressure feed line 218 runs, at least in part, in the hub GN which is affixed in the transmission housing. The clutch B includes also a dynamic pressure compensation, which will later be more exactly described.

As can easily be seen in FIG. 4a, the clutches B, E are interconnected as a component group with each other. In this way, the clutch E is to be found at least in an approach to being completely within the clutch space of the clutch B, which said space is formed by means of the outside disks carrier 220 (clutch cylinder) of the coupling B. A disk packet 500 with outside and friction disks of the clutch E is located, when seen spatially, almost completely underneath the disk packet 200 of the clutch B. An entry element 520 of the clutch E is designed as a outside disks carrier, in the form of a pot, opening in the opposite direction to the housing wall GW. On the inside diameter an at least predominately cylindrical section 521 of the outside disks carrier 520 has a characteristic come-along profile provided for the picking up of the outside disks of the disk packet 500. Connected on the housing wall GW side of this cylindrical section 521 is an at least partially disks shaped section 522 of this outside disks carrier 520 on the cylindrical section 521 and extends itself—bordering on the piston 214 and the restoration element 213 of the clutch B—radially to the inside, up to a hub 523 to which it is firmly bound. In the course of this exemplary formulation of the torque resistant connection of the input element 520 of the clutch E on the input driving shaft AN, this hub 523 is manufactured of one piece with the input drive shaft AN, that is to say, made as a hub-like section of the input drive shaft AN. In another embodiment the hub 523 can, however, be fabricated as a separate component, which is firmly bound to the disks-like section 522 of the outside disks carrier 520. In the presented embodiment of FIG. 4a, the hub 523 possesses further a come-along profile, by means of which the hub 223 of the entry element 220 of the clutch B is securely form-fit on the input drive shaft AN.

A servo apparatus for the activation of the clutch E is located within the outside disks carrier 520 of the clutch E. In this arrangement, a piston 514 of this servo apparatus borders onto the outside disks carrier section 522 and forms, together with the outside disks carrier section 522 a pressure space 511 of the servo apparatus of the coupling E. In the case of a pressurization of this said pressure space 511 by means of an appropriate pressure feed line 518, the piston 514 activates the disks 500 in a direction contrary to the housing wall GW. This motion is opposed again by a restoration force of a restoring element 513 which is depicted here as a plate spring. The activation direction of both clutches B and E is the same. The pressure line feed 218 runs at least in part into the transmission housing affixed hub GN.

As has already been discussed, the input elements 220, 520 rotate the input elements 220, 520 of both clutches B, E always with a speed of rotation equal to that of the input drive shaft AN. For the compensation of the respective dynamic pressure because of the rotation of the pressure medium filled pressure spaces 211, 511, for both clutches B, E a dynamic pressure compensation space is provided. The clutch B possesses for this purpose a pressure compensation space 212, which is located on that side of the piston 214 which is remote from the pressure space 211 and which is formed by the piston 214, a section of the hub 219 and the outside disks carrier 520 of the clutch E. The piston 214 of the clutch B, in order to counter the outside disks carrier 520 or the clutch E is axially and slidably sealed. Without pressure the pressure compensation space 212 is filled by a lubrication medium feed 219. For the dynamic pressure equivalence of the clutch E, a compensation space 512 has been provided. This compensation space 512 is on that side of the piston 514 which is remote from the pressure space 511 and which compensation space 512 is formed by the piston 514 and a push-plate 515, The piston 514 and the push-plate 515 are, in this arrangement, sealed axially against one another, whereby the push-plate 515 is axially affixed to the input drive shaft AN. In the given drawn example, by means of a prestressing, of the restoration element 513 of the clutch E, by means of which the push-plate 515 is pushed against a sealing ring engaged within a complementary input drive shaft groove to make a security ring.

For the obligatory measurement of the speed of rotation of the input drive shaft AN, there has been provided an appropriate input drive shaft tachometer NAN of conventional construction, which tachometer indicates a correspondingly made velocity curve on the outside diameter of the input element 220 of the clutch B, which it obtains, advantageously, without touching said shaft.

An output element 230 of the clutch B is designed as an inner disks carrier, with a cylindrical section 231, on the outside diameter of which a characteristic come-along profile is provided for the picking up of the friction disks of the disk packet 200. Likewise, having a disks shaped section 232, which fits to the cylindrical section 231 on its side which is remote from the piston 214. This extends itself radially inward, up to a hollow hub 233, with which it is securely bound. This hollow hub 233 extends itself axially in a direction counter to the clutch B and is, in this case, exemplary bound by means of a come-along profile with a sun gear shaft SOW1 for the kinematic coupling of the output element 230 of the clutch B with the sun gear SO1 of the first planetary gear set RS1. The output element 230 of the clutch B completely overlaps the disk packet 500 of the clutch E in an axial direction.

An output element 530 of the clutch E is designed as an inner disks carrier. A cylindrical section 531 of this inner disks carrier 530 extends itself at least partially axially above the push-plate 515 and possesses on its outside diameter an appropriate come-along for the acceptance of the friction disks of the disk packet 500. Upon that side of the cylindrical section 531 which is remote from the piston 514, a disks shaped section 532 of the inner disks carrier 530 connects onto the cylindrical section 531 and extends itself—parallel bordering the disks shaped section 233 of the inner disks carrier 230 of the clutch B—radial inward, up to a spider shaft STW1, with which it is securely bound. Obviously, this connection can be made between the inner disks carrier 530 and the spider shaft STW1 also in a force-fit manner. The spider shaft STW1 takes over the kinematic connection of the output element 530 of the clutch E with the spider ST1 of the first planetary gear set RS1. In this matter, the spider shaft STW1 is made as a hollow shaft, which, first, runs radially inside of the hub 233 of the output element of the clutch B (that is, the sun shaft SOW1) and centrally penetrates through this. Second, it is penetrated from the input drive shaft AN centrally.

Further, seen in the direction of the interior space of the transmission housing GG, and on that side of the coalesced clutch arrangement remote from the housing wall GW, with the two clutches B and E, there is connected to the said coalesced clutch arrangement a housing intermediate wall GZ. Here, this intermediate housing wall GZ borders immediately on the disk packet 200 and the disks shaped section 232 of the output element 230 if the clutch B. The three shafts, namely SOW1, STW1 and AN, which run axially coalesced with one another, penetrate the housing intermediate wall GZ through the center.

As is further to be seen in FIG. 4a, the two brakes D and C, spatially observed, are located one above the other. In this case, the brake D, spatially seen, is the outer shifting element of the two brakes C and D. A disk packet 400 with outer and frictional disks of the brake D borders on that side of the intermediate housing wall GZ which is opposite to the two clutches B, E, and is axial to the said intermediate housing wall GZ. In this spatial section, the transmission housing GG simultaneously takes on the function of an outside disks carrier of the brake D and possesses for this service, on its inner diameter, an appropriate come-along profile for the acceptance of the outside disks of the disks carrier 400. In this manner, the largest possible disks diameter for the brake D is achieved, which, in accord with the concept, is the most stressed of all the five shifting elements A to E. Obviously, it is also possible, that the outside disks carrier of the brake D can also be executed as a separate component, which then can, upon appropriate torque bearing means, be connected with the transmission housing GG.

A servo apparatus of the brake D is integrated into the intermediate wall of the housing GZ. A piston 414 of this servo apparatus is located axially slidable in a corresponding piston space of the intermediate housing wall GZ and forms, together with this, a pressure space 411. For the activation of the brake D, this said pressure space is filled with pressure medium by means of a pressure medium feed line also integrated in the intermediate housing wall GZ. This having been done, then the piston 414 activates the disks 400 of the brake D against a restoring force of a, for example, plate spring serving as a restoration element 413 in a direction contrary to the housing wall GW.

One input element 420 of the brake D is designed as a cylindrical inner disks carrier and, spatially observed, is essentially radially placed under the disk packet 400 of the brake D. On the outer diameter of the cylindrical section 421 is a characteristic come-along profile provided for the acceptance of the friction disks of the disk packet 400. The inner disks carrier 420 of the brake D is coupled to the spider ST1 of the first planetary gear set RS1. For this action, the cylindrical section 421 on that side of the disk packet 400 which is remote from the intermediate housing wall GZ is connected with a first (drive motor side) spider plate STB11 of the spider ST1. Under this condition, the inner disks carrier 420 of the brake D and the spider plate STB11 can be, for example, made as one piece. Obviously, inner disks carrier 420 and the spider plate STB11 in another embodiment could also be made as separate entities, which then in a form-fit or force-fit, or material-fit manner can be connected with one another.

Spatially observed, the brake C is placed completely underneath the brake D. In this way, the disk packet 300 with outer and friction disks of the brake C is placed at least predominately, when seen axially, radially underneath the disk packet 400 of the brake D. The entry element 420 of the brake D overlaps thus the disk packet 300 of the brake C. An output element 330 of the brake C is designed as an outside disks carrier, with a cylindrical shaped section 331, which, on its inner diameter has an appropriate come-along profile for the acceptance of the outer disks of the disk packet 300. In a simple and design concept, this outer disks carrier 330 is integrated in the intermediate wall GZ, as a cylinder shaped projection, which extends itself radially underneath the disk packet 400 of the brake D in the direction of the first planetary gear set RS1.

A servo apparatus of the brake C is likewise integrated in the intermediate wall GZ, located radially underneath the servo apparatus of the brake D. A piston 314 of the servo apparatus of the brake C is axially slidable, located in a complementary piston space of the intermediate housing wall GZ. The piston 314 together with the intermediate housing wall GZ form a pressure space 311. The piston 314 of the brake C is also placed radially underneath the piston 414 of the brake D. For the activation of the brake C, the said pressure space 311, by means of a pressure medium feed line 318, likewise, integrated in the intermediate housing wall GZ, is filled with pressure means, whereupon the piston 314 activates the disks 300 of the brake C against a restoring force of an exemplary plate spring restoring element 313, the disks moving in the direction opposite to that of the housing wall GW. The activation direction of the two brakes C, D is also the same direction.

An entry element 320 of the brake C is designed as a cylinder shaped inner disks carrier, and, spatially observed, is at least predominately located radially underneath the disk packet 300 of the brake C. The said entry element possesses accordingly on its outside diameter an appropriate come-along profile for the acceptance of friction disks of the disk packet 300. Further, the said entry element 320, so revised, is connected on that side of the disk packet 300 which is remote from the piston 314 or remote from the intermediate housing wall GZ and thus is kinematically connected to the sun gear SO1 of the first planetary gear set RS1. In the presented design in FIG. 4*a*, the inner disks carrier 320 of the brake C, for this purpose, is securely bound to the sun gear shaft SOW1, which as before, already centrally penetrates the intermediate housing wall GZ. First, in the presented example, this sun gear shaft SOW1, is form-fit with the hub 233 of the output element 230 of the clutch B, which is placed on that side of the intermediate housing wall which is remote from the brake C. Second, the said sun gear shaft SOW1 is connected on that side of the disk packet 300 of the brake C, which is opposite to the intermediate housing wall GZ, with the sun gear SO1 of the first planetary gear set RS1. Obviously it is possible, that the torque transmitting connection between the inner disks carrier 320 of the brake C and the sun gear SO1 and the output element 230 of the clutch B can advantageously be otherwise arranged, for instance with a form-fit connection between the inner disks carrier of the brake C and the sun gear shaft and/or with a one piece construction of the son gear of the first planetary gear set RS1 and the sun shaft and/or with a one piece construction of the hub of the output element of the clutch B and the sun shaft.

As may be seen from FIG. 4*a*, there arises through the proposed component assembly for the four shifting elements B, E, C, D together on one side of the first planetary gear set RS1, which is proximal to the drive motor (not shown) of the automatic transmission, achieves a very compact, transmission construction, of an optimal installation size for the two thermally and statically highly stressed shifting elements B and D.

FIG. 4*b* shows the output side partial section of the invented constructive example in accord with FIG. 4. The spider ST1 of the first planetary gear set RS1 possesses a second spider plate STB12, which is located on that side of the planet gear PL1 which is opposite to the first spider plate STB11. This output side located second spider plate 12 is form-fit with the spider shaft STW1, which said shaft completely and centrally penetrates the first planetary gear set RS1. Also, the spider shaft STW1 in the area of the spider plate STB2 is bearingly supported on the input drive shaft AN.

In the direction of the output power, the second planetary gear set RS2 connects itself axially, directly on the first planetary gear set RS1. The spider ST2 of the second planetary gear set RS2 with its planetary gears PL2 borders axially on the second spider plate STB12 of the first planetary gear set RS1. The second spider plate STB12 of the first planetary gear set RS1 is, at its outside diameter fast bound to the internal gear HO2 of the second planetary gear set RS2. The sun gear SO2 of the second planetary gear set RS2 is form-fit with the input drive shaft AN, whereby the input drive shaft AN fully penetrates, centrally, the sun gear SO2 and extends itself up to beneath the third planetary gear set RS3, which, when viewed axially in the direction of the output connects directly onto the second planetary gear set RS2.

On its side which is proximal to the third planetary gear set RS3, the spider ST2 of the second planetary gear set RS2 possesses a spider plate STB2, onto which the spider ST3 of the third planetary gear set RS3 with its planetary gears PL3 axially borders. The spider plate STB2 of the second planetary gear set RS2 is securely bound at its outside diameter to the internal gear HO3 of the third planetary gear set RS3. The spider ST3 which borders onto the spider plate STB2 extends itself inward up to the input drive shaft AN, upon which it is bearingly supported and centrally and completely penetrates the sun gear SO3 of the third planetary gear set RS3 and is connected on its side which is remote from the second planetary gear set RS2 with the output drive shaft AB of the automatic transmission by means of an appropriate come-along profile and is form-fit in its connection. The sun gear SO3 is, meanwhile, is bearingly supported on the cylindrical section of the spider ST3, which centrally penetrates the sun gear SO3. This radial support of the sun gear SO3 and the spider ST3 extends itself, as seen in the axial direction, at least sectionally radially above the previously mentioned radial support of the output drive shaft AB and the spider ST3, whereby a totally satisfactory radial force reaction is achieved.

Furthermore, the spider ST3 of the third planetary gear set RS3 possesses on that side remote from the second planetary gear set RS2 a spider plate STB3, which extends itself radially toward a diameter greater than that of the internal gear HO3. On its outside diameter, this spider plate STB3 is form-fit installed in a cylinder ZYL. This cylinder extends itself in an axial direction away from the internal gear HO1 of the first planetary gear set RS1 up to above the internal gear HO3 of the third planetary gear set RS3 and is securely bound to the internal gear HO1. The cylinder ZYL completely overlaps also the second and third planetary gear sets RS2 and RS3 in the axial direction. The torque connection of the internal gear HO1 to the output drive shaft AB is carried out by means of the spider ST3 of the third planetary gear set RS3 and the axial penetration of the spider ST3 which is to be found centrally under the sun gear SO3 of the third planetary gear set RS3. Obviously, it is possible that the torque carrying connection between the internal gear HO1 and the cylinder ZYL can be advantageously otherwise executed, for instance by one-piece manufacture of the internal gear HO1 and the cylinder ZYL, or a form-fit connection. It is easy to see, that likewise the torque carrying connection between the cylinder ZYL and the spider plate STB3 can be well carried out differently, for instance as a one-piece construction of the cylinder and the spider plate STB3 or as a material closure connection.

The output drive shaft AB which here runs coaxially with the input drive shaft AN is supported in an output sided wall of the transmission housing GG and penetrates this wall in a direction of a drive string which is not shown, and which is operationally connected with the output drive shaft AB. For the achievement of a strong bearing support of the output drive shaft AB in the transmission housing GG, two bearings with relatively large axial extent are provided, whereby the neighboring bearing to the third planetary gear set RS3 which is supported on, or is placed within a housing projection, which projection extends itself from the output side wall of the transmission housing GG axially into the interior of the transmission housing GG in the direction of the third planetary gear set RS3. For a simplified measurement of a rotation of the output drive shaft AB, a tachometer NAB of normal construction is provided, which records an accordingly, well arranged indication profile of the outside diameter of the cylinder ZYL without touching the same.

Obviously it is possible that two of such tachometers, that is, a combined output drive shaft tachometer with two sensors could be provided, in order that additionally the absolute speed of rotation of the output drive shaft AB as well as the direction of rotation could be determined.

As may be seen further from 4B, this arrangement of the three planetary gear sets RS1, RS2, RS3 in a row, next to one another is definitely compact and very favorable from the assembly standpoint.

Seen spatially, the brake A is placed on that side of the third planetary gear set RS3 which is remote from the second planetary gear set RS2, thus being on the output side of the transmission housing GG. In this way, a disk packet 100 borders with outer and frictional disks the brake A directly at the spider plate STB3 of the third planetary gear set RS3. The sun gear SO3 of the third planetary gear set RS3 is bound on its side remote from the second planetary gear set RS2 with a entry element 120 of the brake A which is designed as an inner disks carrier. In the presented example, this binding is by means of welding. In another embodiment, the input element 120 of the brake A can also be engaged in a complementarily designed come-along profile of the sun gear SO3. Here, as in the direction of transmission output of an open steel plate pot designed entry element 120 possesses on its cylindrical section 121, a come-along profile for the acceptance of the frictional disks of the disk packet 100. Also, this disk packet 100 is placed on relatively large diameter, spatially seen, somewhat of the order of the diameter of the internal gear HO3 of the third planetary gear set RS3. The transmission housing GG possesses in this zone a come-along profile for the acceptance of the outside disks of the disk packet 100. The housing also takes over in the manufacture and mounting areas, in a favorable manner, the function of an outside disks carrier for the brake A. Obviously in another embodiment, it is possible that even a separate outside disks carrier for the brake A can be provided, which then, by means of appropriate means is connected with the transmission housing.

A servo apparatus of the brake A is, in the manufacture and mounting areas, very direct in a favorable manner and integrated in the transmission housing GG. For this purpose, the output side outer wall of the transmission housing GG possesses a corresponding piston-pressure space, as well as corresponding channels 118 for pressure medium feed for this said space 111. In this piston space 111, a pressure responsive piston 114 of the servo apparatus for the brake A is slidingly mounted. Upon the application of pressure to the said pressure space 111, the piston 114 activates the disks 100 of the brake A, working against a restoring force of a restoring element 113, which is depicted here, for example, as a plate spring. The activation is in the direction of the third planetary gear set RS3. In another embodiment, provision could be made that the output side outer wall of the transmission housing could be carried out as a separate entity, connected with the housing cover which is connected with the transmission housing, which cover can accept both the servo apparatus of the brake A as well as the outer disks of the brake A.

As may be seen further in 4a and 4b, for the axial support of the transmission components, in each of the following locations an axial bearing has been provided: between the hub GN and the hub shaped section 523 of the input drive shaft AN, between the input drive shaft AN and the spider shaft STW1, between the spider shaft STW1 and the hub 233, which said hub is connected with the sun gear SOW1 of the output element 230 of the clutch B, between the sun gear SO1 and the spider plate STB12, between the spider plate STB12 and the sun gear SO2, between the sun gear SO2 and the spider plate STB2, between the spider plate STB2 and the spider ST3, between the spider ST3 and the sun gear SO3, as well as between the sun gear SO3 and the transmission housing GG.

FIG. 5 shows a second schematic component assembly, for example, for the achievement of the purpose of the invention. In this arrangement, this second invented component assembly arose from the previously explained (with reference to FIG. 2) kinematic coupling of the three planetary gear sets RS1, RS2, RS3 and the five shifting elements, as well as from the explained (in FIG. 3) first invented component assembly. The coaxial alignment of the input drive shaft AN and the output drive shaft AB, the middle transmission part with the three planetary gear set RS1, RS2, RS3 which are placed successively next to one another in a row, as well as the arrangement of the brake A on that side of the third planetary gear set RS3 which is remote from the two planetary gear sets RS1, RS2, all as taken, without change, from FIG. 3. Also, the other four shifting elements B to E, as in FIG. 3 are placed on that side of the first planetary gear set RS1 which is remote from the planetary gear sets RS2 and RS3, that is to say, on that side of the three adjacently disposed planetary gear sets RS1, RS2, RS3, which side is opposite to the shifting element A. Since the proposed component assembly shown in FIG. 5 is conceived as exemplary for a drive string in a standard drive, the four shifting elements B, C, D, and E are placed on the input drive side of the automatic transmission and the shifting element A is located on output drive side of the said automatic transmission, as shown in FIG. 3. In regard to the principal, possible modification for the presentation of a front-cross-drive, this will be described later below.

As is to be seen in FIG. 5, different from FIG. 3, there is now provided no intermediate housing wall. Now, as before, the two brakes C and D, when observed spatially, are placed one above the other, whereby the brake D forms the spatially large outer shifting element of the two. Now, however, this is directly bordering on the input motor, outside wall of the transmission housing GG, which outside wall is designated GW. The disks 400 of the brake D are at least partially, when seen in the axial direction, placed radially above the disks 300 of the brake C. In the example which is depicted in FIG. 5, the housing wall GW serves simultaneously as a disks carrier for both brakes D and C. An appropriate come-along profile for the outer disks of the disk packet 400 of the brake D is provided on the largest possible diameter at the inside diameter of a first cylindrical projection protruding into the interior of the transmission housing GG. The servo apparatus 410 of the brake D is integrated in the housing wall GW and activates the disks 400 axially in the direction of the first planetary gear set RS1. An appropriate come-along profile for the outer disks of the disk packet 300 of the brake C is provided at the inside diameter of a second cylindrical projection of the housing wall GW, which extends itself radially underneath the servo apparatus 410 and the disks 400 of the brake D, axially into the interior of the transmission housing GG. The servo apparatus 310 of the brake C is likewise integrated into the housing wall GW, placed radially beneath the second cylindrical projection of the housing wall GW, and activates the disks 300 axially in the direction of the first planetary gear set RS1. Corresponding to this arrangement, it is found, that both the input element 420 of the brake D as well as the input element 320 of the brake C, respectively serve as inner disks carriers. The inner disks carrier 320 of the brake C is, in this arrangement, supported on a hub GN of the housing wall GN. The hub extends itself—similar as the two provided with the disks-come-along profiles having the cylindrical projections of the housing wall GW—axially in the direction of the first planetary gear set RS1 into the interior of the transmission housing.

In another embodiment, provision can be made, that the outside disks carrier of the brake D is not integrated into the housing wall GW, but rather in the transmission housing GG, which then possesses an appropriate come-along profile for the outer disks of the brake D. Obviously, it is possible, that the outside disks carrier of the brake D also can be made as a separated entity, which then torque communicatively connects itself with housing wall GW or with the transmission housing GG by appropriate binding means. Obviously, even the outside disks carrier of the brake C can be made as a separate element, which then is torque-communicatively connected to the transmission housing wall GW by appropriate means.

In still another embodiment, provision can be made, that the input element of the brake D and/or the input element of the brake C are not designed as inner disks carriers, but as outer disks carriers, whereby, then the housing wall GW has an appropriate come-along profile for the inner disks of the respective disk packet.

Similar to FIG. 3, also in FIG. 5 the two clutches B and E are coalesced into each other, whereby the clutch E is completely located within a clutch space of the clutch B, which is formed by means of a clutch cylinder of the clutch B. Different from FIG. 3, these two coalesced clutches B and E, spatially seen, are now neighboring the first planetary gear set RS1, axially between the two, one-above-the-other brakes C, D and the first planetary gear set RS1.

In this way, the input element 520 of the clutch E is formed as an outer disks carrier, in the form of a pot, which opens in the direction of the first planetary gear set RS1. The base of this pot 520 is connected to the input drive shaft AN and borders, in this arrangement, sectionally, the hub GN of the housing wall GW. At the inner diameter of the cylinder surface of this pot 520, an appropriately shaped come-along profile takes up the outside disks of the disk packet 500 of the clutch E. The servo apparatus 510 of the clutch E is placed within this pot, wherein it axially directly borders the base thereof and activates the disks 500 axially in the direction of the first planetary gear set RS1. Correspondingly, the output element 530 of the clutch E is designed as at least predominately a disks-shaped inner disks carrier, which, when seen in the axial direction, is placed underneath the disk packet 500 and extends itself radially inward up to the known spider shaft STW1 of FIG. 3, with which it is connected. The spider shaft, which centrally penetrates the first planetary gear set RS1, again as in FIG. 3, is designed as an internal gear. Within this internal gear, the input drive shaft AN runs. This establishes the kinematic connection between the clutch E and the spider ST1 of the first planetary gear set RS1 and between the internal gear HO2 of the second planetary gear set RS2 and the brake D, which internal gear HO2 is also connected to the spider ST1.

The input element 220 of the clutch B and the input element 520 of the clutch E are seen as a compacted, common component. The outside disks carrier 520 of the clutch E is simultaneously an inner disks carrier 220 of the clutch B. In this respect, on the outside diameter of the cylindrical section of the pot-shaped outside disks carrier 520 of the clutch E, additionally an appropriate come-along profile is provided for the acceptance of the friction disks of the disk packet 200 of the clutch B. The disks 200 of the clutch B are, when seen in the axial direction, are placed, at least partially radially, over the disks 500 of the clutch E. The output element 230 of the clutch B is correspondingly designed as an outside disk carrier, in the form of a two-sided, largely closed cylinder. This outside disk carrier 230 forms the previously named clutch space of the clutch B, within which, the clutch B is placed.

Geometrically, the output element 230 of the clutch B possesses an at least an extensive cylindrical section 231 as well as two generally disk-shaped sections 232 and 234. The cylindrical section 231 accepts within its interior diameter, the outside disks of the disk packet 200 and extends itself above the disk packet, first in the direction of the first planetary gear set RS1 up to above the disks 200 and second, extends axially in the direction of the housing wall GW up to the dick packet 300 of the brake C. The first disk-shaped section 232 connects itself onto the cylindrical section 231 upon that side thereof which is proximal to the first planetary gear set RS1 and extends further radially inward up to the sun shaft made known in FIG. 3, with which it is connected. The sun shaft SOW1 is, as per FIG. 3, constructed as an internal gear, upon which the spider shaft is bearingly supported and establishes the kinematical connection between the clutch B and the sun gear SO1 of the first planetary gear set RS1. As is made known in FIG. 5, the first disk-shaped section 232 of the output element 230 of the clutch B is attached by its outside diameter advantageously in the cylindrical section 231 of the output element 230 of the clutch B and can, from this position, be interpreted as a flange shaped section of the sun gear SOW1. The second disk-shaped section 234 of the output element 230 connects itself on the cylindrical section 231 on that side of which, the housing wall GW or the disks 300, is proximal and extends itself radial inward up to a hub 233, with which the said section 234 is connected. This hub 233 is rotationally supported on the housing affixed hub GN of the housing wall GW and is connected with the disk-shaped input element 320 (inner disk carrier) of the brake C. The second disk-shaped section 234 of the output element 230 of the clutch B runs thus, at least sectionally-wise, parallel to and bordering the input element 320 (inner disk carrier) of the brake C.

The servo apparatus 210 of the clutch B is likewise within the clutch space which has been formed by the cylindrical output element 230 of the clutch B. Further, the said apparatus is axially bordering on the second disk-shaped section 234 and sectionally radially bordering on the cylindrical section 231, and activates the disks 200 of the clutch B axially in the direction of the first planetary gear set RS1. With this arrangement, the servo apparatus rotates the clutch B, likewise with a rate of rotation equal to that of the input drive shaft AN as does the servo apparatus 510 of the clutch E.

In another embodiment, provision can also be made, so that the servo apparatus of the clutch B is placed on that side of the disks proximal to the first planetary gear set RS1 and activates the disks the opposite direction to the first planetary gear set RS1. In this case, the servo apparatus rotates the servo apparatus of the clutch B with a speed of rotation of the sun gear SOW1, but can also be motionless. In a further embodiment provision can be made, that the servo apparatus of the clutch E on that side of the disks of the clutch E, which side is proximal to the first planetary gear set RS1. This servo apparatus activates the disks in a contrary direction to that of the first planetary gear set RS1. In this case, the servo apparatus of clutch E rotates constantly with the speed of rotation of the spider shaft STW1.

As may be further determined from FIG. 5, is that here, as example, the input element 420, here designed as an inner disk carrier of the brake D is made as a cylinder, which overlaps completely the output element 230 of the clutch B and therewith also the clutch B radially, in the axial direction. On that side of the first disk-shaped section 232 of the output element 230 of he clutch B, which said side is proximal to the first planetary gear set RS1, here extends the cylinder shaped inner disk carrier 420 of the brake D radially inward up to the spider ST1 of the first planetary gear set RS1, with which it is bound.

As to FIG. 6, a practically constructed transmission will be explained, wherein the kinematic coupling and the spatial arrangement of the three single planetary gear sets RS1, RS2, RS3 and the five shifting elements A to E within the transmission housing and arranged relative to one another in the principle of FIG. 5, which is there shown schematically in a sketch. Corresponding to the coaxial arrangement, in this embodiment, of the input drive shaft AN and the output drive shaft AB, this automatic transmission is ideal for a motor vehicle with a standard drive. For a better presentation of the section of the transmission, two sections, 6a and 6b are shown, wherein, that portion of the of the automatic transmission which is proximal to the driving motor (motor not shown) is shown in FIG. 6a and the output drive section of the automatic transmission is depicted in FIG. 6b.

Figure 6A:
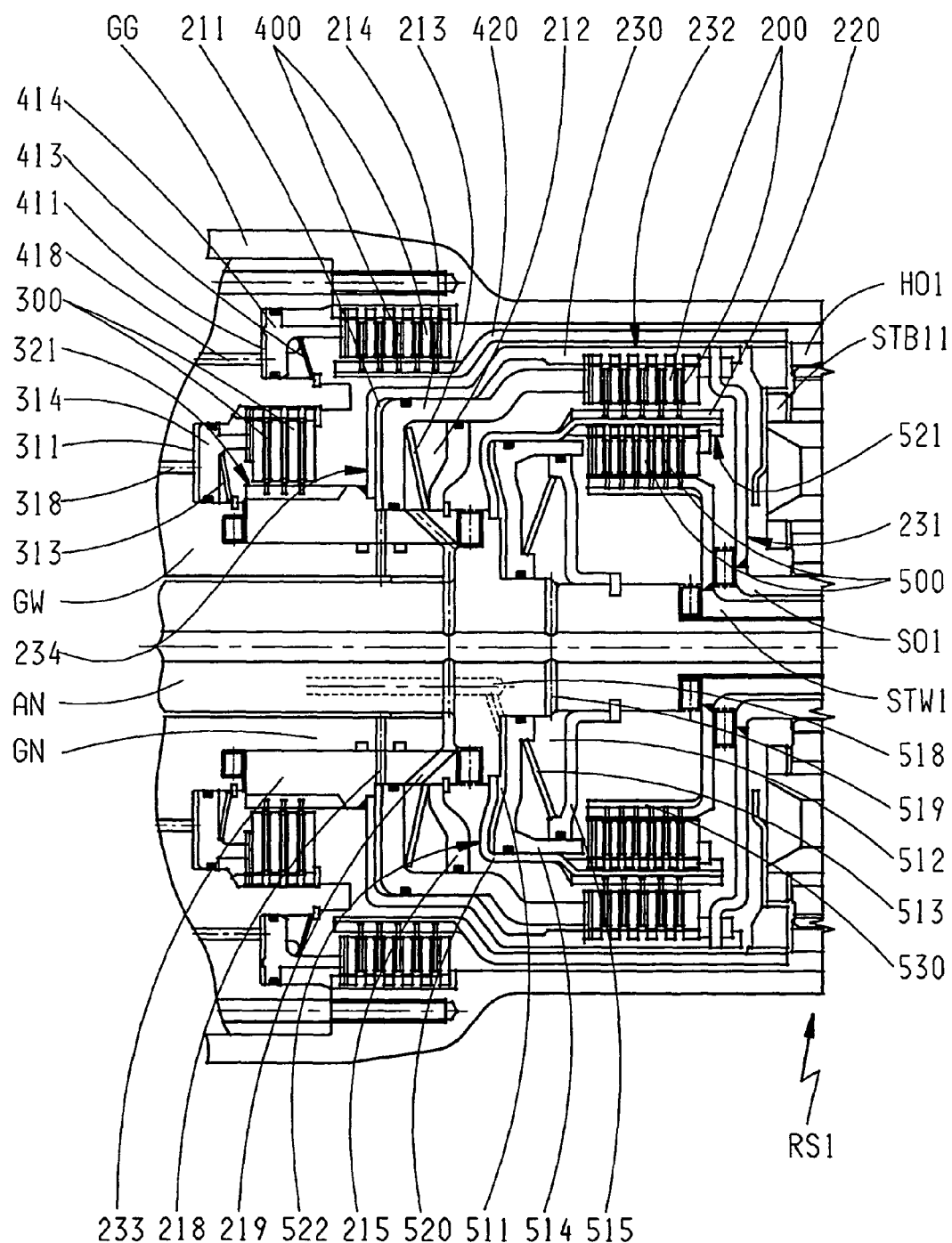
FIG. 6 a section of the transmission in accord with FIG. 5, i.e., 5a and 5b.
Figure 6B:
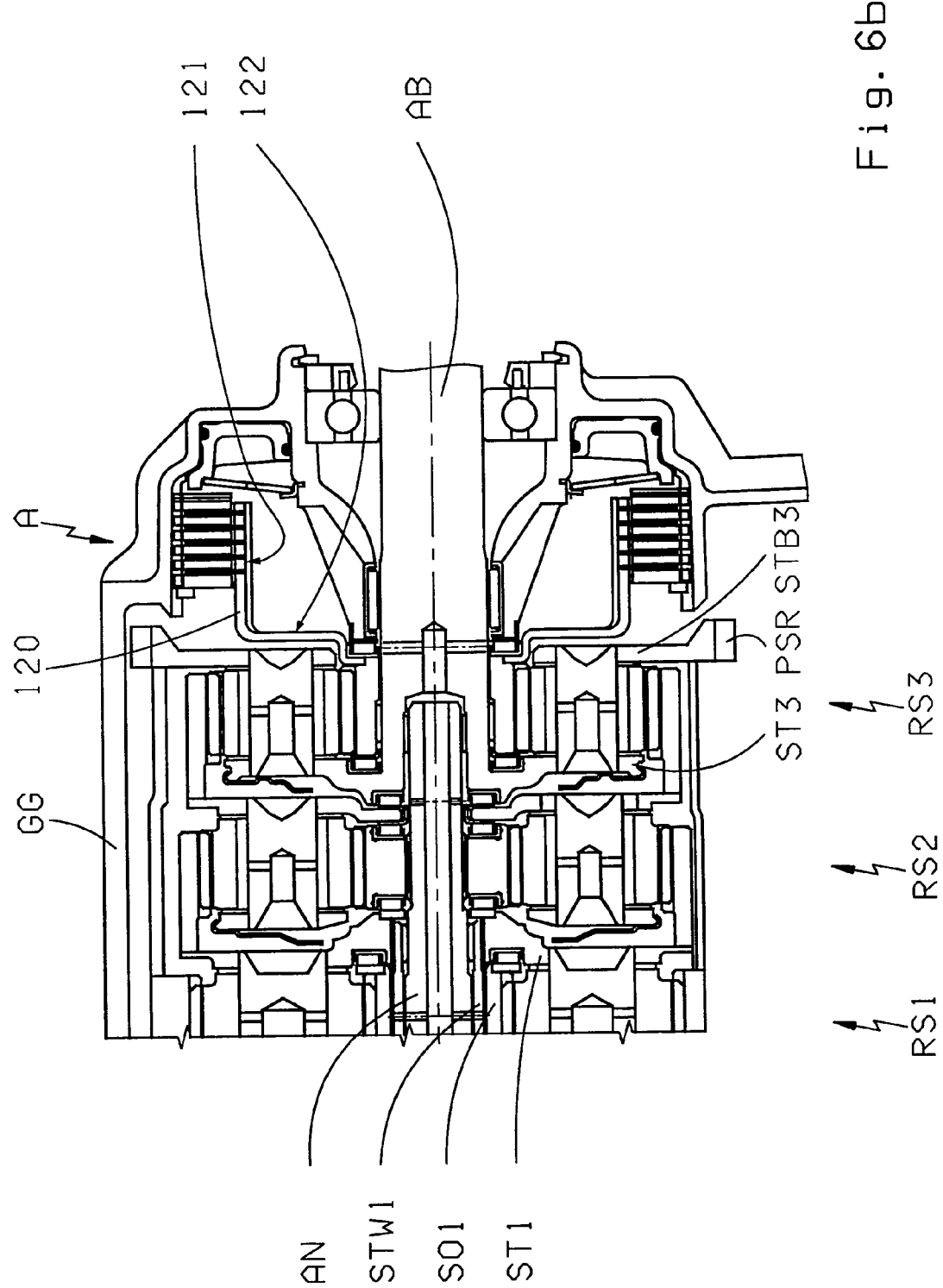

As can be seen in FIG. 6a, the housing wall GW is bolted to the transmission housing GG. The housing wall GW forms an outer wall of the automatic transmission and is proximal to the drive motor, which latter is not shown. In the housing wall GN it is possible to house a (not shown) oil pump, by means of which the automatic transmission is supplied with lubricating means and the shifting elements of the automatic transmission are furnished with a pressure medium. The input drive shaft AN, which is operationally connected with the driving motor penetrates the housing wall GW centrally in the area of the housing hub. This housing hub GN extends itself axially into the interior of the automatic transmission. Above the hub GN is placed the hub 233 of the output element 230 of the clutch B, which element is rotatably affixed to the hub 233. Besides its function of the bearing support of the output element 230 of the clutch B and the pressure and lubrication medium feed for the servo apparatus of the clutch B, the hub 233 takes over simultaneously the function of an inner disk carrier for the brake C. For this purpose, a cylindrical section of the hub 233, which is proximal to the housing wall GW, simultaneously forms the cylindrical section 321 of the input element (inner disk carrier) of the brake C with an appropriate come-along profile for the acceptance of frictional disks of the disk packet 300 of the brake C. The disks 300 are also, when seen in the axial direction, are at least sectionally radially located above the hub 233 of the output element 230 of the clutch B. The function of the outside disk carrier for the brake C is taken over by the housing wall GW. For this purpose, a cylindrical projection of the housing wall GW extends itself radially above the disks 300 of the brake C, axially in the interior space of the automatic transmission and possesses on its inner diameter an appropriate come-along profile for the acceptance of the outside disks of the disk packet 300. The servo apparatus of the brake C is likewise integrated in the housing wall GW, whereby a piston 314 of this servo apparatus is slidingly placed in a corresponding piston space of the housing wall GW. The piston 314 and housing wall GW form in this way a pressure space 311, which, by means of the pressure medium feed 318 can be filled therewith. In the case of the application of pressure into the pressure space 311, the piston 314 activates the disks 300 of the brake C in a direction opposite to the housing GW, and works against a restoration force, which is here generated by, for example, a plate spring for a restoration element 313 of the servo apparatus of the brake C.

The brake D is set above the Brake C, whereby the disks 400 of the brake D have a greater diameter than do the disks 300 of the brake C. As may be seen if FIG. 6a, the disks 400 and 300 of the two brakes D, C, different than in FIG. 5, are not placed directly over one another, but are somewhat axially displaced, whereby the disk packet 400 is closer to the first planetary gear set RS1 than is the disk packet 300. The servo apparatus of the brake D is—as is already the servo apparatus of the brake C—integrated into the housing wall GW. In this way, a piston 414 of this servo apparatus of the brake D is placed in an axial direction, radially above the cylindrical projection of the housing wall GW, under which the disk packet 300 of the brake C is already placed. The piston 414 is in a corresponding piston space of the housing wall GW and is axially slidable. The piston 414 and the housing wall GW form, as this is done, a pressure space 411, which, by means of a pressure feed line 418 can be filled with pressure medium. Upon the application of this pressure to the pressure space 411, the pressure responsive piston 414 activates the disks 400 of the brake D in a direction counter to the housing wall GW. The activation motion is countered by a restoration force of a restoration element 413, which is here described as a plate spring. On the geometric formation of the input element 420, which has been designed as an inner disk carrier, the brake D will be later discussed.

Seen in the direction of the first planetary gear drive RS1, the clutch B attaches itself axially to the two one-upon-the-other arranged brakes C and D. Geometrically, the output element 230 of the clutch B, which is designed as an outside disk carrier, is constructed as a double ended, predominately closed cylinder, with one, at least extensive cylindrical section 231 as well as two at least generally disk-shaped sections 232, 234. The cylindrical section 231 accepts in its inside diameter the outside disks of the disk packet 200 of the clutch B and extends itself above the disk packet 200, first, axially in the direction of the first planetary gear drive RS1 up to and beyond over the disks 200 and, second, axially in the direction of the housing wall GW up to the disk packet 300 of the brake C. The second disk shaped section 234 of the output element 230 connects itself onto the cylindrical section 231 onto that side proximal to the housing wall GW or to the disks 300, and further extends itself radial inward to the previously mentioned hub 233, with which it is connected. The outside contour of the cylindrical section 231 and the second disk-shaped section 234 of the output element 230 of the clutch B is, in this arrangement, adapted to the spatial location of the directly bordering disk packets 300 and 400 of the two respective brakes C and D. By this means, in the zone of the disk packet 400, an off-angular run of this outside contour arises. As has already been mentioned, the hub 233 is rotatable on the hub GN which is affixed to the housing GG and is bound with the inner disk carrier 320 of the brake C. As FIG. 6a shows, the cylindrical section 231 of the second disk-shaped section 234 and the hub 233 of the output element 230 form a common component, namely, the outside disk carrier of the clutch B. Geometrically this outside disk carrier has the form of a pot, which is open in the direction of the first planetary gear drive RS1. On that side of this outside disk carrier of the brake B, which is proximal to the first planetary gear drive RS1, is a disk shaped component, which forms the first disk-shaped section 232 of the output element 230 of the clutch B, and which is form-fit on the said pot. This form-fit connection (between cylindrical and a first disk-shaped section 231, 232) is advantageously a come-along profile of the same division as the toothed profile of the outside disk of the disk packet 200, thus mounting friendly and satisfactory from a manufacturing and assembly standpoint. The disk-shaped component 232, which is built as a steel plate component, extends itself—parallel bordering on the input drive side spider plate STB11 of the first planetary gear drive RS1—radially to the inside up to the sun gear of the first planetary gear drive RS1, and is, in the presented example, firmly bound to the sun gear SO1 by means of a welding connection. From a manufacturing standpoint, it is also fortunate here—in a differing construction to FIG. 3—that an intermediate sun shaft SOW1 can be dispensed with.

Comprised of the cylindrical section 231, the second disk-shaped section 234 and the hub 233 of the output element, the outside disk carrier of the clutch B forms a clutch space for the said clutch B, within which both the servo apparatus of the clutch B as well as the clutch E are fully installed.

This servo apparatus of the clutch B includes, besides a piston 214 for the activation of the disks 2000 of the clutch B and a restoration element 213, as well as a push-plate 215 for a dynamic pressure compensation. The hub 233 and the sections 234 and 231 form a piston space, in which the piston 214 is slidingly inserted, and together with the said piston 214, is a pressure space 211, which, by means of a pressure medium feed line 218 can be filled with a pressurized medium. Upon subjecting the said pressure space 211 to pressure, the piston 214 activates the disk 200 axially in the direction of the first planetary gear drive RS1. The motion of this activation is contrary to a restoring force of a restoring element 213. This restoring element is, here, shown as an example as a plate spring, which finds abutment above the push plate 215 on the hub 233. Obviously, the restoring element 213, for example, can be an annular spring or a ring-spring packet. For the compensation of the dynamic clutch pressures of the pressure space 211 which continually rotates at the speed of rotation of the sun gear of the first planetary gear drive RS1, a compensation space 212 has been allowed, which is placed on that side of the piston 214 which is proximal to the first planetary gear drive RS1. Further in this arrangement, the said compensation space 212 is formed by means of the piston 214 and the sealed push plate 215 which can be caused to slide axially toward the said piston 214. This pressure compensation space 212 can be filled without pressure with lubricating oil by means of lubricating medium feed channeling 219 and produces, because of the same rotation as the pressure space 211, a counter force, which acts to oppose the pressure on the piston in regard to the dynamic pressure of the pressure space 211, whereby the pressures are advantageously nearly equaled.

The lubrication medium supply of the dynamic pressure equivalence, (pressure compensation space 212) of the clutch B is done by a central boring within the input drive shaft AN. The supply of pressure medium of the pressure space 211 of the clutch B runs at least partially inside the hub GN which is affixed to the housing wall GW.

When observed in the direction of the first planetary gear drive RS1, the input element 520 of the clutch E connects itself axially on the push plate 215 of the servo apparatus of the clutch B. Geometrically, this input element 520 is designed as a pot, which opens in a direction to the first planetary gear drive RS1, and takes over the function of an outside disk carrier for the clutch E. A disk-shaped section 522 of the input element 520 is securely bound on its inside diameter with a flange shaped piece of the input drive shaft AN with the said input drive shaft AN. In the presented embodiment, this connection is made by welding. Directly axially bordering on the push plate 215, there extends the disk-shaped section 522 radially toward the outside up to a diameter, which represents to some degree the inside diameter of the disks 200 of the clutch B, or, said again, represents to some degree the outside diameter of the disks 500 of the clutch E. On its outside diameter a cylindrical section 521 of the input element 520 of the clutch E attaches itself onto the disk-like section 522. This cylindrical section 521 extends itself in the axial direction almost to the second disk-shaped section 231 of the output element 230 of the clutch B, thus, on to the edge of the clutch space, which has been formed by the outside disk carrier of the clutch B. An its inside diameter, this cylindrical section 521 possesses an appropriate come-along profile for the acceptance of the outside disks of the disk packet 500 of the clutch E.

At the same time, the cylindrical section 521 of the input element 520 of the clutch E has, on its outer diameter, a proper come-along profile for the acceptance of the friction disks of the disk packet 200 of the clutch B. In this way, the input element 520 of the clutch E simultaneously takes over the function of the input element 220, that is to say, the inner disk carrier of the clutch B. As is seen in FIG. 6a, the disk packets 200 and 500 of the clutches B and E, spatially observed, are almost completely located above one another, whereby the diameter of the disks 200—representing their thermal stress—have a greater diameter than do the disks 500.

The servo apparatus of the clutch E is placed within the outer disk carrier 520 of the clutch E. Similarly as for the clutch B, a clutch which rotates constantly with the input drive shaft AN is provided for a dynamic pressure compensation balance. Outside disk carrier 520 and a hub-shaped section of the input drive shaft AN form a piston and pressure space 511 of the servo apparatus of the clutch B, in which a piston 514 is axially slidably placed. This pressure space 511 can be filled by a pressure medium feed line 518. In the case of applying pressure to the said pressure space 511, then the piston 514 activates the disks 500 of the clutch E axially in the direction of the first planetary gear drive RS1. This activation is done against the counter force of a restoring element 513. The said restoring element 513 is described here as a plate spring, which supports itself by means of a push plate 515 on the input drive shaft AN. This push plate 515, once again, is a part of the dynamic pressure compensation of the clutch E, and is, toward the piston 514 is slidably sealed in the axial direction and forms, together with the piston 514 a pressure compensation space 512. This pressure compensation space 512 can be filled, without pressure, with lubrication medium by means of lubrication feed lines 519. The said space 512 can also produce, because of the same rotation as the pressure space 511, a counter force which reacts on the piston 514 for the dynamic pressure of the pressure space 511, and this, advantageously, comes close to balancing.

The lubrication means supply of the dynamic pressure equivalence, (pressure compensation space 512) of the clutch E is carried out again by means of a central boring within the input drive shaft AN. The pressure medium supply of the pressure space 511 of the clutch E runs, in the here presented embodiment, by means of a axial boring of the input drive shaft AN. This, however, can at least run partially within the hub GN which is securely mounted on the housing wall GW.

The output element 530 of the clutch ER is designed as a cylinder-shaped inner disk carrier, which, on its outside diameter possesses a come-along profile for the pickup of the friction disks of the disk packet 500. On its inner diameter, is found the output element 530 securely bound to the known (from FIG. 5) spider shaft STW1. In the presented embodiment, this closure is made by welding. This spider shaft STW1 extends itself radially above the input drive shaft AN axially in the direction of the transmission output and said spider shaft completely penetrates the sun gear SO1 of the first planetary gear drive RS1. On the side of the first planetary gear drive RS1, which is remote from the clutch E, is to be found the spider shaft STW1 bound with the spider ST1 of the first planetary gear drive RS1, as may be seen in FIG. 6b.

With further attention given to FIG. 6a, to be seen is the geometric design of the input element 420 of the brake D. This input element 420, which is designed as an inner disk carrier, is constructed as a cylinder with relatively greater axial extension. On its side proximal to the housing wall GW, this inner disk carrier 420 possesses an appropriate come-along profile for the acceptance of the friction disk of the disk packet 400. In the further run axially in the direction of the first planetary gear drive RS1, the inner disk carrier 420 overlaps the brake D, next completely overlaps the cylindrical section 232 of the output element 230, i.e., the outside disk carrier of the clutch B, and extends itself into the area of the internal gear HO1 of the first planetary gear drive RS1. In this area, is the inner disk carrier 420 of the brake D bound with the input side spider plate STB11 of the spider ST1 of the first planetary gear drive RS1, in the presented example the closure is form-fit. Obviously this connection can be carried out by force-fit or material-bonding.

In the presented output side part of the automatic transmission as shown in FIG. 6b, having the three, arranged successively in a row, planetary gear drives RS1, RS2, RS3, as well as the brake A which is placed on the output side of the transmission housing GG. This represents, essentially, the first described construction example which has been closely explained with the aid of FIG. 4b, so that, at this place, a detailed discussion can well be eliminated. A slight difference to FIG. 4b is found in the geometric design of the input element 120 which serves as an inner disk carrier of the brake A. This has a modified contour of the disk-shaped section 122 of the inner disk carrier 120. A further difference to FIG. 4b, concerns the formation of the output drive shaft AB, which no longer is built as one piece with the spider ST3 of the third planetary gear drive RS3. As an addition detail to be mentioned, is, that in FIG. 6b a park-blocking gear PSR, which is securely bound to the spider plate STB3 of the third planetary gear drive RS3. In a known manner, a park-blocking gear PSR of this type has, on its circumference, evenly distributed, a toothing, in which a complementary park-blocking link (not shown) for the locking of the output drive shaft AB can engage.

As already mentioned, the transmission scheme put forth in FIG. 3, in regard to the assembly of the input and output drive shafts of the automatic transmission relative to one another is to be looked upon as a superior concept. FIG. 7, however, now shows an exemplary variation of the schematic component arrangement in accord with FIG. 3, but now without the coaxial alignment of the input drive shaft and the output drive shaft. Starting from the component arrangement proposed in FIG. 3, the input drive shaft AN and the output drive shaft AB are now so located as to be axis parallel with one another. For the kinematic connection of the output drive shaft AB internal gear HO1 of the first planetary gear drive RS1, which is here continually connected with the spider ST3 of the third planetary gear drive RS3, a spur gear stage STST is proposed, which, seen spatially, is placed on that side of the third planetary gear drive RS3 which is opposite to the second planetary gear drive RS2, and axially between the third planetary gear drive RS3 and the clutch A. In this arrangement is a first spur gear STR1 of this spur gear stage STST connected securely with the spider ST3 of the third planetary gear drive RS3, and, as an example, bearingly connected to the sun gear SO3 of the third planetary gear drive RS3. A second spur gear STR2 of this spur gear stage STST is designed as a stage toothed gear, the first toothing of which meshes with the first spur gear STR1, and the second toothing of which engages with third spur gear STR3 of the said spur gear stage STST. This third spur gear STR3, once again, is securely bound with the output drive shaft AB. Obviously, it is possible, that instead of the here described three gear spur gear stage, also an appropriate other spur gear stage could be proposed, or even a chain system.

Figure 7:
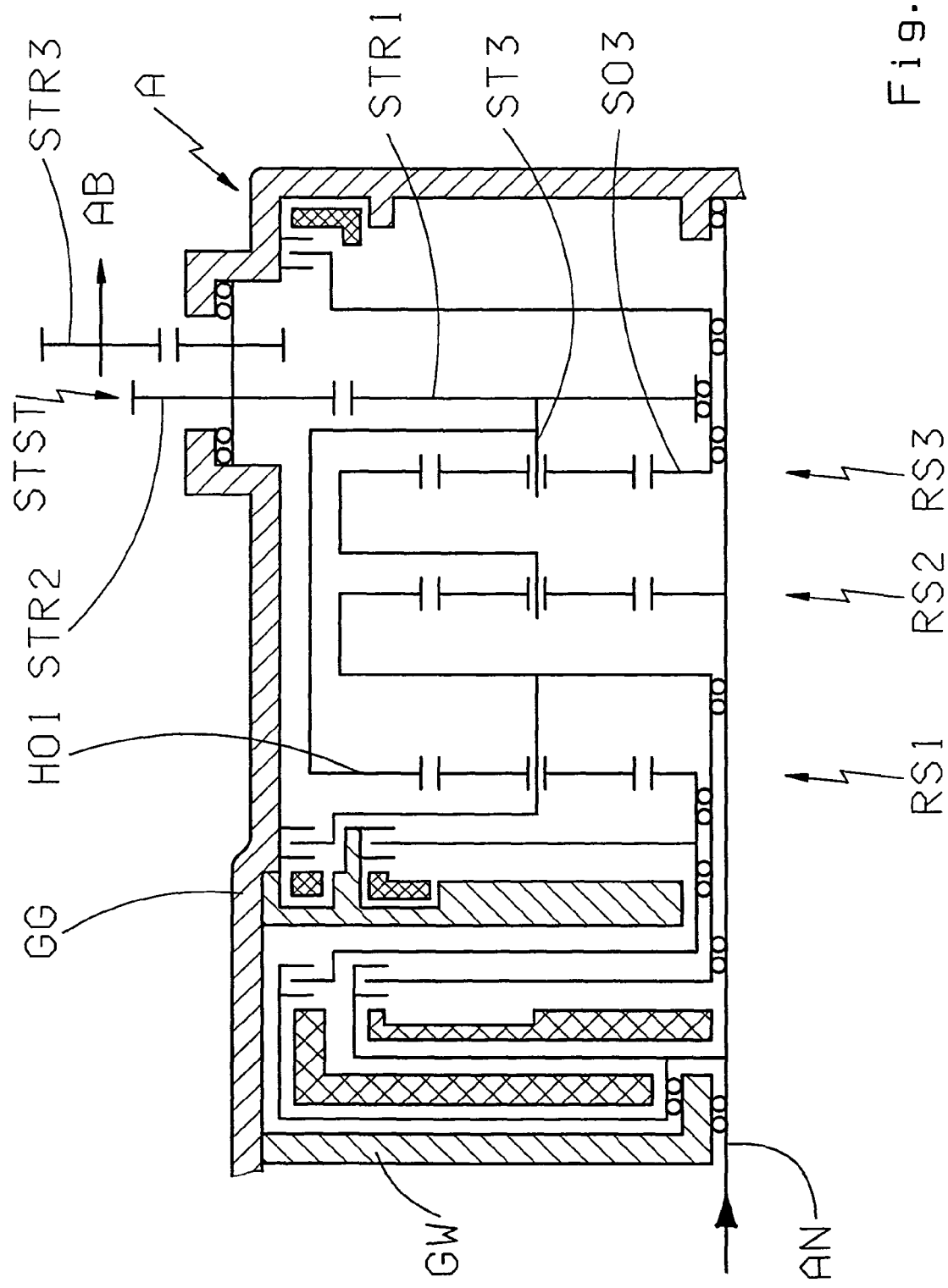
FIG. 7 an exemplary variation of the schematic component assembly of FIG. 3, with a non-coaxial alignment of the input and output drive shafts.

As likewise from FIG. 7 may be seen, the input drive shaft AN penetrates the housing wall GW and all three planetary gear drives RS1, RS2, RS3 centrally and is mounted on the cover-like outer wall of the transmission housing GG, which lies opposite to the housing wall GW, The driving motor, which, for simplicities sake has not be shown, of the automatic transmission is also placed on the housing wall GW on the remote side of the planetary gear drive. For the expert, it is easily seen, that the input drive shafts penetrate the cover-like outer wall of the transmission housing GG, which lies opposite to the housing wall GW and the drive motor accordingly on this side of the transmission could be located near to the shifting element A.

In order that the invented multi-stage transmission could be installed even in another configuration of the motor vehicle drive string, the expert, by the proposing of similar modifications, including even an angular alignment of the input and the output drive shafts of the automatic transmission, or the addition of a tapered drive instead of the before described spur gear stage for a front drive with a built in motor aligned longitudinal to the direction of travel.

As already mentioned, the described transmission scheme in the FIGS. 3, 5 and 7 can be seen as exemplary even for the invented coupling of the planetary gear drives among each other and to the shifting elements as well as the input and output drive shafts of the automatic transmission. FIG. 8 now shows an example of a variation in the schematic component assembly in accord with FIG. 3, with a modified coupling of the individual planetary gear elements, whereby these kinematic couplings of the planetaryu gear elements are already from the state of the technology as put forth by DE 199 12 480 A1. As a difference to FIG. 3, now, in FIG. 8, the internal gear HO1 of the first planetary gear drive RS1 and the spider ST2 of the second planetary gear drive RS2 and the output drive AB are continually bound together, as long as the spider ST3 of the third planetary gear drive RS3 of the third planetary gear drive RS3 is continually engaged with the internal gear HO2 of the second planetary gear drive RS2 and the spider ST1 of the first planetary gear drive RS1 is continually engaged with the internal gear HO3 of the third planetary gear drive RS3. Further, the kinematic coupling of the three single planetary gear drives RS1, RS2, RS3 on the five shifting element A to E and on he input shaft AN as compared to FIG. 3 remains unchanged. Also the spatial arrangement of the five shifting element s A to E relative to one another and to the three single planetary gear drives RS1, RS2, RS3 is not changed from that shown in FIG. 3.

Figure 8:
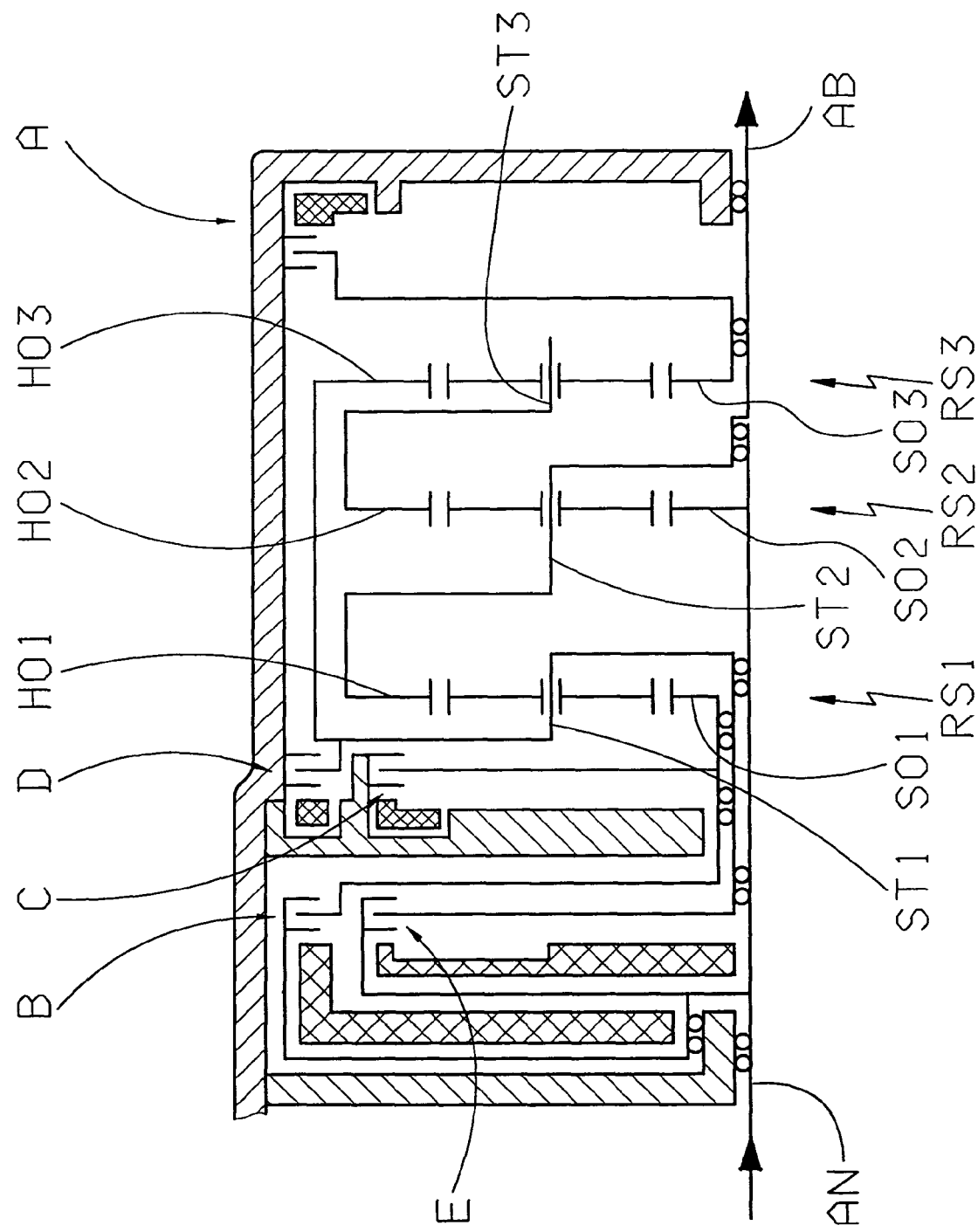
FIG. 8 an exemplary variation of the schematic component assembly as in FIG. 3, with a modified coupling of individual gear set elements.

The expert has the capability of transferring these described transmission schemes of FIG. 8 and FIG. 3, logically also to those presented in FIG. 5 and FIG. 7.

The presented schematic component assemblies presented in FIG. 3 to FIG. 8 and also the advantageously carried out transmission design of 4*b* and 4*a*, are based predominately on the use of disks as a constructing solution for the shifting elements serving as brakes. Principally, the single or even all disk brakes can be constructively replaced by band breaks. In the non-shifted condition, band brakes, where slipping moment is concerned, it is better handled by band brakes than by disks. For all demonstrated component assemblies, what is therein offered, is that in the second to the sixth forward gears, non-shifted brake D and/or the in the fifth and sixth forward gear, as well as in the reverse gear, non-shifted brake A, all can be carried out as a band brake.

REFERENCE NUMBERS AND CORRESPONDING PARTS

A first shifting element, a brake
B second shifting element, a clutch
C third shifting element, a brake
D fourth shifting element, a brake
E fifth shifting element, a clutch
AN input drive shaft
AB output dive shaft
GG complete housing of transmission
GW a wall of transmission housing
GN a hub, affixed to housing
GZ an intermediate wall of transmission housing
ABF flange, output
NAN input shaft tachometer
NAB output shaft tachometer
PSR parking block gear
ZYL cylinder
STST spur gear stage
STR1 first spur gear of STST
STR2 second spur gear of STST
STR3 third spur gear of STST
RS1 first planetary gear set
HO1 internal gear of the first planetary gear set
SO1 sun gear of the first planetary gear set
ST1 spider of the first planetary gear set
PL1 planet gear of the first planetary gear set
SOW1 sun shaft of the first planetary gear set
STB11 first spider plate of the first planetary gear set
STB12 Second spider plate of the first planetary gear set
STW1 spider shaft of the first planetary gear set
RS2 second planetary gear set
HO2 internal gear of the second planetary gear set
SO2 sun gear of the second planetary gear set
ST2 spider of the second planetary gear set
PL2 planet gear of the second planetary gear set
STB2 spider plate of the second planetary gear set
RS3 third planetary gear set
HO3 internal gear of the third planetary gear set
SO3 sun gear of the third planetary gear set
ST3 spider of the third planetary gear set
PL3 planet gear of the third planetary gear set
STB3 spider plate of the third planetary gear set
100 disk of the first shifting element
110 servo apparatus of the first shifting element
111 pressure space of the first shifting element
113 restoration element of the servo apparatus of the first shifting element
114 piston of the servo apparatus of the first shifting element
118 pressure medium feed to the pressure space of the first shifting element
120 input element of the first shifting element
121 cylindrical section of the input element of the first shifting element
122 disk-shaped section of the input element of the first shifting element
200 disks of the second shifting element
210 servo apparatus of the second shifting element
211 pressure space of the second shifting element
212 pressure compensation space of the second shifting element
213 restoration element of the servo apparatus of the second shifting element
214 piston of the servo apparatus of the second shifting element
218 pressure delivery means to the pressure space of the second shifting element
219 lube feed to the pressure compensation space of the second shifting element
220 input element of the second shifting element
221 cylindrical section of the input element of the second shifting element
222 disk-shaped section of the input element of the second shifting element
223 hub of the input element of the second shifting element
230 output element of the second shifting element
231 cylindrical section of the output element of the second shifting element
232 (first) disk-like section of the output element of the second shifting element
233 hub of the output element of the second shifting element
234 (second) disk-like section of the output element of the second shifting element
300 disks of the third shifting element
310 servo apparatus of the third shifting element
311 pressure space of the third shifting element
313 restoration element of the servo apparatus of the third shifting element
314 piston of the servo apparatus of the third shifting element
318 pressure medium feed to the pressure space of the third shifting element
320 input element of the third shifting element
321 cylindrical section of the input element of the third shifting element
322 disk-like section of the input element of the third shifting element
331 cylindrical section of the output element of the third shifting element
400 disks of the fourth shifting element
410 servo apparatus of the fourth shifting element
411 pressure space of the fourth shifting element
413 restoration element of the servo apparatus of the fourth shifting element
414 piston of the servo apparatus of the fourth shifting element
416 activation-stamp of the fourth shifting element
418 pressure medium feed to the pressure space of the fourth shifting element
420 input element of the fourth shifting element
421 cylindrical section of the input element of the fourth shifting element
500 disks of the fifth shifting element 510 servo apparatus of the fifth shifting element
511 pressure space of the fifth shifting element
512 pressure compensation space of the fifth shifting element
513 restoration element of the servo apparatus of the fifth shifting element
514 piston of the servo apparatus of the fifth shifting element
515 push-plate of the servo apparatus of the fifth shifting element
518 pressure medium feed to the pressure space of the fifth shifting element
519 lube feed to the pressure compensation space of the fifth shifting element
520 Input element of the fifth shifting element
521 cylindrical section of the input element of the fifth shifting element
522 disk-shaped section of the input element of the fifth shifting element
523 hub of the input element of the fifth shifting element
530 output element of the fifth shifting element
531 cylindrical section of the output element of the fifth shifting element
532 disk-shaped section of the output element of the fifth shifting element

What is claimed is:

1. A multi-stage automatic transmission, with an input drive shaft (AN), and an output drive shaft (AB), at least three single planetary gear sets (RS1, RS2, RS3), as well as at least three shifting elements (A to E), wherein
said three planetary gear sets (RS1, RS2, RS3) are aligned coaxially and immediately adjacent to one another,
a second planetary gear set (RS2), as seen spatially, is placed between a first and a third planetary gear sets (RS1, RS3),
one sun gear (SO3) of the third planetary gear set (RS3) is secured to a first shifting element (A) and a transmission housing (GG) of the multi-stage automatic transmission,
the input drive shaft (AN) is connected with a sun gear (SO2) of the second planetary gear set (RS2),
the input drive shaft (AN) is connected by means of one of a second shifting element (B) with a sun gear (SO1) of the first planetary gear set (RS1) and by means of a fifth shifting element (E) with a spider (ST1) of the first planetary gear set (RS1),
the sun gear (SO1) of the first planetary gear set (RS1) is connectable with one of the input drive shaft (AN), by a second shifting element (B), and the transmission housing (GG), by a third shifting element (C),
a spider (ST1) of the first planetary gear set (RS1)is connectable with one of the input shaft (AN), by a fifth shifting element (E), and the transmission housing (GG) by a fourth shifting element (D),
the output drive shaft (AB) is connected with an internal gear (HO1) of the first planetary gear set (RS1) and with one of the spiders (ST2, ST3) of the second or the third planetary gear set (RS2, RS3); and
wherein the third and the fourth shifting element (C, D), seen spatially, are substantially axially aligned and placed radially above one another and in that the fifth (E) and the second (B) shifting element, seen spatially, are substantially axially aligned and placed radially above one another.

2. The multi-stage automatic transmission according to claim 1, wherein the third shifting element (C), seen spatially, is placed radially underneath the fourth shifting element (D), whereby disks (300) of the third shifting element (C) possess a smaller diameter than do disks (400) of the fourth shifting element (D).

3. The multi-stage automatic transmission according to claim 2, wherein a servo apparatus (310) of the third shifting element (C), when seen spatially, is at least predominately placed underneath a servo apparatus (410) of the fourth shifting element (D).

4. The multi-stage automatic transmission according to claim 1, wherein the servo apparatuses (310, 410) of the third and the fourth shifting elements (C, D) are integrated in common within a housing wall (GW) affixed to a principal transmission housing (GG), which form an outer wall of the said principal transmission housing (GG).

5. The multi-stage automatic transmission according to claim 1, wherein the servo apparatuses (310, 410) of the third and the fourth shifting elements (C, D) are integrated in common within a housing wall (GW) affixed to a principal transmission housing (GG), which form an outer wall of the said principal transmission housing (GG).

6. The multi-stage automatic transmission according to claim 1, wherein the servo apparatus (310) of the third shifting element (C) activates one of disks (300) of the third shifting element (C), and a servo apparatus (410) of the fourth shifting element (D) activates disks (400) of the fourth shifting element (D) in the direction of the first planetary gear set (RS1).

7. The multi-stage automatic transmission according to claim 1, wherein disks (500) of the fifth shifting element (E) are placed radially beneath disks (200) of the second shifting element (B).

8. The multi-stage automatic transmission according to claim 1, wherein the fifth shifting element (E) is placed at least predominately within a clutch space of the second shifting element (B), which is formed by means of a clutch cylinder of the second shifting element (B).

9. The multi-stage automatic transmission according to claim 8, wherein the clutch space of the second shifting element (B) is formed by means of an input element (220) of the second shifting element (B), which is connected with the input drive shaft (AN).

10. The multi-stage automatic transmission according to claim 8, wherein the clutch space of the second shifting element (B) is formed by means of an output element (230) of the second shifting element (B), which said output element (230) is connected with a sun gear (SO1) of the first planetary gear set (RS1).

11. The multi-stage automatic transmission according to claim 8, wherein a servo apparatus (510) of the fifth shifting element (E) is placed at least predominately within the clutch space of the second shifting element (B).

12. The multi-stage automatic transmission according to claim 1, wherein a servo apparatus (510) of the fifth shifting element (E) is supported on the input drive shaft (AN).

13. The multi-stage automatic transmission according to claim 1, wherein a servo apparatus (210) of the second shifting element (B) is supported on the input drive shaft (AN).

14. The multi-stage automatic transmission according to claim 1, wherein a servo apparatus (210) of the second shifting element (B) is supported on a hub (GN) of a housing wall (GW) which is attached to the housing (GG).

15. The multi-stage automatic transmission according to claim 7, wherein the second shifting element (B) possesses a dynamic pressure compensation, a pressure compensation, a pressure compensation space (211) of which is formed by a servo apparatus (210) of the second shifting element (B) and a clutch cylinder of the fifth shifting element (E).

16. The multi-stage automatic transmission according to claim 15, wherein the pressure compensation space (211) of the second shifting element (B) is formed by a piston of the servo apparatus (210) of the second shifting element (B) and an outside disk carrier (520) of the fifth shifting element (E).

17. The multi-stage automatic transmission according to claim 1, wherein a servo apparatus (210) of the second shifting element (B) activates one of the disks (200) of the second shifting element (B) and a servo apparatus (510) of the fifth shifting element (E) activates disks (500) of the fifth shifting element (E) axially in a direction of the first planetary gear set (RS1).

18. The multi-stage automatic transmission according to claim 1, wherein an output element (230) of the second shifting element (B) at least partially overlaps disks (500) of the fifth shifting element (E) radially in an axial direction.

19. The multi-stage automatic transmission according to claim 1, wherein one of the third and the fourth shifting element (C, D) is placed on a side of the planetary gear set (RS1) which is remote from the second planetary gear set (RS2).

20. The multi-stage automatic transmission according to claim 19, wherein the third and the fourth shifting element (C, D), disks (300, 400) of the third and the fourth shifting element (C, D) border directly axially on the first planetary gear set (RS1) upon a side thereof which is remote from the second planetary gear set (RS2).

21. The multi-stage automatic transmission according to claim 1, wherein the second and the fifth shifting element (B, E) are placed on a side of the first planetary gear set (RS1) which is remote from the second planetary gear set (RS2).

22. The multi-stage automatic transmission according to claim 20, wherein the second and the fifth shifting element (B, E) border directly axially on a housing wall (GW), which is affixed to a housing, which forms an outer wall of a transmission housing (GG).

23. The multi-stage automatic transmission according to claim 21, wherein the third and the fourth shifting element (C, D), spatially observed, is placed axially between the first planetary gear set (RS1) and one or more of the second and fifth shifting element (B, E).

24. The multi-stage automatic transmission according to claim 23, wherein the second and the fifth shifting element (B, E) is placed on a side of a intermediate housing wall (GZ) which is remote from the first planetary gear set (RS1).

25. The multi-stage automatic transmission according to claim 24, wherein disks (200, 500) of one or more of the second and the fifth shifting elements (B, E) border axially directly on the intermediate housing wall (GZ).

26. The multi-stage automatic transmission according to claim 11, wherein a intermediate housing wall (GZ) is centrally penetrated by a sun gear shaft (SOW1) which is designed as an internal gear, by means of which, an output element (230) of the second shifting element (B) becomes bound with the sun gear (SO1) of the first planetary gear set (RS1), whereby radially, there runs within this sun shaft (SOW1) a spider shaft (STW1) which likewise has been constructed as an internal gear, by means of which an output element (530) of the fifth shifting element (E) is bound with the spider (ST1) of the first planetary gear set (RS1), and whereby the input drive shaft (AN) runs radially within this spider shaft (STW1).

27. The multi-stage automatic transmission according to claim 21, wherein the second and the fifth shifting element (B, E) border directly and axially on the first planetary gear set (RS1) on that side thereof which is remote from the second planetary gear set (RS2).

28. The multi-stage automatic transmission according to claim 1, wherein the first shifting element (A), when spatially observed, is placed on a side of the third planetary gear set (RS3) which is remote from the second planetary gear set (RS2).

29. The multi-stage automatic transmission according to claim 28, wherein a servo apparatus (110) of the first shifting element (A) is integrated into one of the transmission housing (GG) and a housing wall (GW) which is secured in said transmission housing (GG).

30. The multi-stage automatic transmission according to claim 1, wherein an outside disk carrier of the first shifting element (A) is integrated in the transmission housing (GG).

31. The multi-stage automatic transmission according to claim 1, wherein the input drive shaft (AN) and the output drive shaft (AB) run coaxial to one another.

32. The multi-stage automatic transmission according to claim 31, wherein the output drive shaft (AB) which is operationally bound with the internal gear (HO1) of the first planetary gear set (RS1), centrally penetrates the third planetary gear set (RS3) in an axial direction.

33. The multi-stage automatic transmission according to claim 31, wherein the output drive shaft (AB), which is operationally bound with the internal gear (HO1) of the first planetary gear set (RS1), centrally and in an axial direction, penetrates a clutch space of the first shifting element (A).

34. The multi-stage automatic transmission according to claim 1, wherein the input shaft (AN) and the output shaft (AB) are not coaxial, an input drive shaft (AN) axis and an output drive shaft (AB) axis are either parallel or angular with respect to one another.

35. The multi-stage automatic transmission according to claim 34, wherein the output drive shaft (AB), when spatially observed in a zone radially above one or more of the first, second and third planetary gear set (RS1, RS2, RS3), is operationally connected with the internal gear (HO1) of the first planetary gear set (RS1).

36. The multi-stage automatic transmission according to claim 1, wherein the internal gear (HO1) of the first planetary gear set (RS1) and the spider (ST3) of the third planetary gear set (RS3) and the output drive shaft (AB) are continually connected with one another and the spider (ST2) of the second planetary gear set (RS2) is continually in connection with an internal gear (HO3) of the third planetary gear set (RS3) and in that the spider (ST1) of the first planetary gear set (RS1) is continually in contact with an internal gear (HO2) of the second planetary gear set (RS2).

37. The multi-stage automatic transmission according to claim 1, wherein the internal gear (HO1) of the first planetary gear set (RS1) and the spider (ST2) of the second planetary gear set (RS2) and the output drive shaft (AB) are all continually in contact with one another, and the spider (ST3) of the third planetary gear set (RS3) is continually in contact with an internal gear (HO2) of the second planetary gear set (RS2) and the spider (ST1) of the first planetary gear set (RS1) is continually connected with an internal gear (HO3) of the third planetary gear set (RS3).

38. The multi-stage automatic transmission according to claim 1, wherein by means of selective closure of the shifting element (A to E), at least six forward gears can be so shifted into, that for the change in gear from one gear into the next successive higher gear, or into the next successive lower gear, from the presently activated gear, in each case, only one shifting element need be opened and an additional shifting element closed.

39. The multi-stage automatic transmission according to claim 1, wherein the shifting elements are closed as follows: in a first forward gear, a first and fourth shifting elements (A, D), in a second forward gear, the first and a third shifting elements (A, C) and in a third forward gear, the first and a second shifting element (A, B), in a fourth forward gear, the first and a fifth shifting element (A, E), in a fifth forward gear, the second and fifth shifting element (B, E), in a sixth forward gear, the third and fifth shifting element (C, E), and in a reverse gear, the second and fourth shifting element (B, D).

40. A multi-stage automatic transmission, with an input drive shaft (AN), and an output drive shaft (AB), at least three single planetary gear sets (RS1, RS2, RS3), as well as at least three shifting elements (A to E), wherein
- said three planetary gear sets (RS1, RS2, RS3) are aligned coaxially to one another,
- a second planetary gear set (RS2), as seen spatially, is placed between a first and a third planetary gear sets (RS1, RS3),
- one sun gear (SO3) of the third planetary gear set (RS3) is secured to a first shifting element (A) and a transmission housing (GG) of the multi-stage automatic transmission,
- the input drive shaft (AN) is connected with a sun gear (SO2) of the second planetary gear set (RS2),
- the input drive shaft (AN) is connectable by means of one of a second shifting element (B), with a sun gear (SO1) of the first planetary gear set (RS1 ), and by means of a fifth shifting element (E), with a spider (ST1) of the first planetary gear set (RS1),
- the sun gear (SO1) of the first planetary gear set (RS1) is affixed affixable to the transmission housing (GG) by means of a third shifting element (C) and the spider (ST1) of the first planetary gear set (RS1) is affixable to the transmission housing by means of a fourth shifting element (D),
- the output drive shaft (AB) is connected with an internal gear (HO1) of the first planetary gear set (RS1) and with one of the spiders (ST2, ST3) of the second or the third planetary gear set (RS2, RS3),
- the third and the fourth shifting element (C, D), seen spatially, are placed radially above one another and in that the fifth (E) and the second (B) shifting element, seen spatially, are placed radially above one another, and
- wherein a servo apparatus (210) of the second shifting element (B) is supported on a hub (GN) of a housing wall (GW) which is attached to the housing (GG).

* * * * *